United States Patent [19]

Shimomura et al.

[11] Patent Number: 5,446,523
[45] Date of Patent: Aug. 29, 1995

[54] IMAGE FORMING APPARATUS HAVING SELF-REPAIR FUNCTION AND SELF-REPAIR METHOD FOR THE APPARATUS

[75] Inventors: Yoshiki Shimomura; Sadao Tanigawa, both of Osaka; Yasushi Umeda, Chofu; Tetsuo Tomiyama, Chiba; Hiroyuki Yoshikawa, Tokyo, all of Japan

[73] Assignee: Mita Industrial Co., Ltd., Japan

[21] Appl. No.: 132,351

[22] Filed: Oct. 6, 1993

[30] Foreign Application Priority Data

Oct. 12, 1992 [JP] Japan .................. 4-273209

[51] Int. Cl.⁶ ............................................. G03G 15/00
[52] U.S. Cl. ................................... 355/207; 395/180
[58] Field of Search ............... 355/202, 204, 206, 208; 371/16.4, 29.1

[56] References Cited

U.S. PATENT DOCUMENTS

| | | | |
|---|---|---|---|
| 5,166,934 | 11/1992 | Tomiyama et al. | 371/16.4 |
| 5,220,373 | 6/1993 | Kanaya | 355/204 |
| 5,239,547 | 8/1993 | Tomiyama et al. | 371/16.4 |
| 5,307,118 | 4/1994 | Morita | 355/208 |

Primary Examiner—Joan H. Pendegrass
Attorney, Agent, or Firm—Beveridge, DeGrandi, Weilacher & Young

[57] ABSTRACT

In an image forming apparatus according to the present invention, a software portion incorporated in the apparatus is provided with a virtual case storage portion 12, to previously create virtual cases by a virtual case compiler 16 outside of the apparatus and store the virtual cases. Fault diagnosis is made by comparing fuzzy qualitative values into which the values of sensors are converted on the basis of fuzzy membership functions with the virtual cases. If a fault is diagnosed as a result of the comparison, repair operations for repairing the fault are read out from a work script table 15. In this case, operation information for repair are stored to correspond to each of a plurality of domains into which a state space which the apparatus can take up is divided. Accordingly, it is possible to correctly read out corresponding repair operations from the work script table 15 depending on which of the domains is a domain to which the present state of the apparatus belongs. As a result, a self-repair system can be constructed as a practical built-in type system, thereby to make it possible to reduce the scale of the system related to the fault diagnosis as well as to reduce time required for the fault repair.

14 Claims, 15 Drawing Sheets

FIG. 13
COMBINATION OF SENSORS
EXISTING IN NEUTRAL SPACE
PATTERN 1
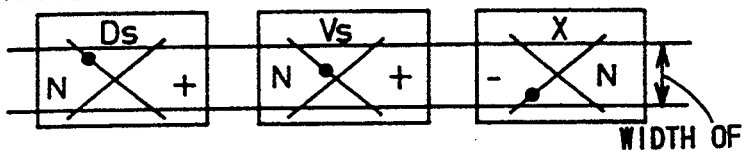
(Ds, Vs)
(Vs, X)
(Ds, Vs, X)
WIDTH OF
NEUTRAL SPACE
PATTERN 2
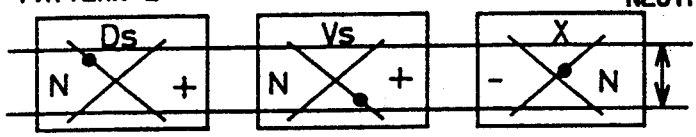
(Ds, X)
(Vs, X)
(Ds, Vs, X)
PATTERN 3
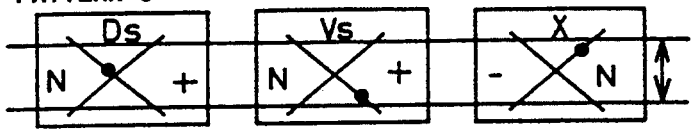
(Ds, Vs)
(Ds, X)
(Ds, Vs, X)
PATTERN 4
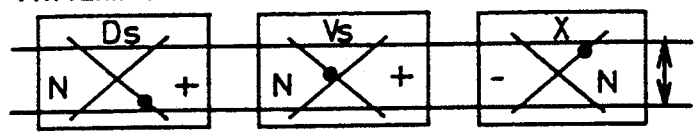
(Ds, Vs)
(Vs, X)
(Ds, Vs, X)
PATTERN 5
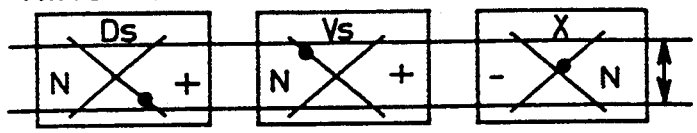
(Ds, X)
(Vs, X)
(Ds, Vs, X)
PATTERN 6
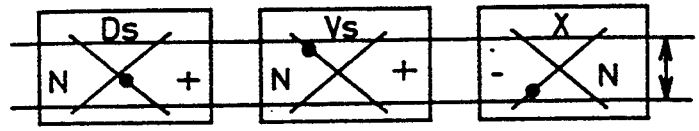
(Ds, X)
(Ds, Vs)
(Ds, Vs, X)

F I G. 1 5
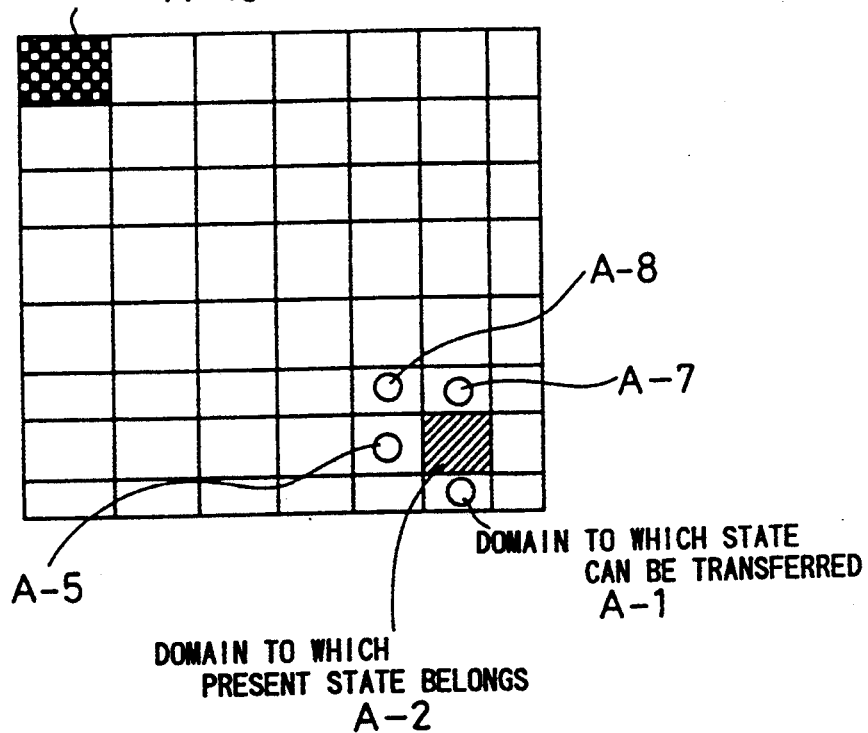

F I G. 17
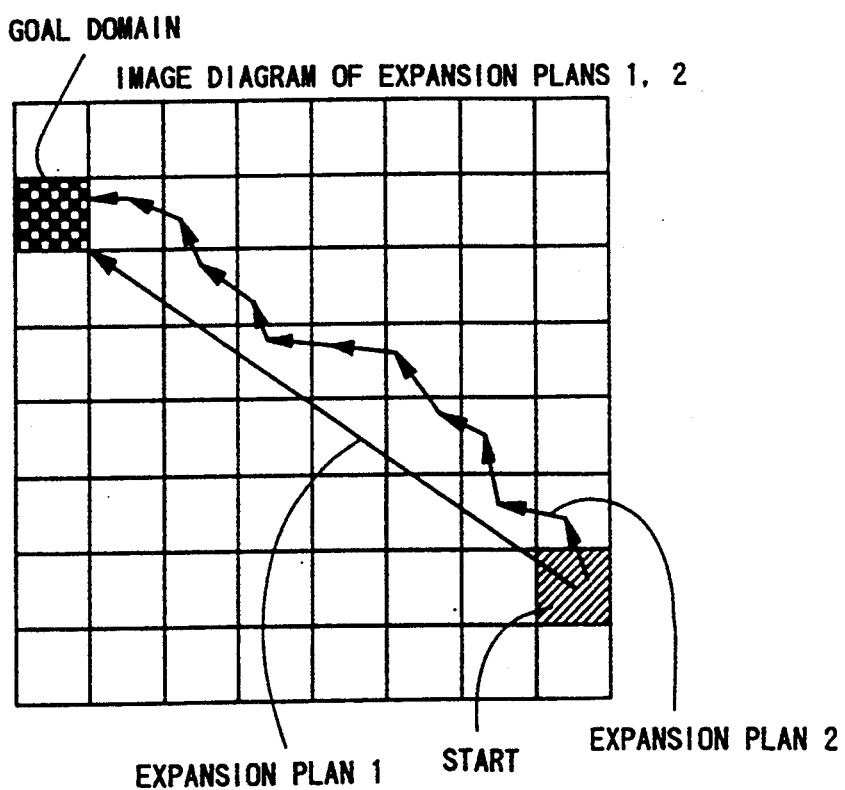

IMAGE FORMING APPARATUS HAVING SELF-REPAIR FUNCTION AND SELF-REPAIR METHOD FOR THE APPARATUS

CROSS REFERENCE TO RELATED APPLICATIONS

The disclosures of Japanese Patent Application Ser. Nos. 4-273209 to 4-273219 are incorporated by reference.

BACKGROUND OF THE INVENTION

1. Field of the Invention

The present invention relates to an image forming apparatus having a self-repair function, and more particularly, to an image forming apparatus capable of making self-diagnosis as to whether the apparatus develops a fault and making self-repair of the fault developed by the apparatus by converting detected values obtained from the apparatus into qualitative values and comparing the qualitative values obtained by the conversion with virtual cases previously found and stored.

2. Description of the Related Art

In the development field of precision instruments, industrial machines and the like, expert systems utilizing artificial intelligence (so-called AI) techniques have been studied extensively in recent years for the purpose of realizing labor saving in maintenance work and long-term automatic operation. The expert systems include one for making self-diagnosis as to whether or not an apparatus develops a fault and making self-repair of the fault developed by the apparatus.

However, the conventional expert system (an automatic control system and a fault diagnosis system) only basically operates an actuator corresponding to a sensor on the basis of an output of the sensor. Accordingly, it is not complete as a self-repair machine.

Therefore, the applicant of the present application has found a machine control method using diagnosis-repair inference on an objective model based on qualitative physics and invented a new self-diagnosis and self-repair system for an image forming apparatus utilizing such a machine control method, to file a patent application (see, for example, Japanese Patent Laid-Open Gazette No. 4-130459).

The self-diagnosis and self-repair system for an image forming apparatus according to the prior application has the following features:

(1) Detected values of sensors provided for the image forming apparatus are converted into qualitative values and the qualitative values are used for control.
(2) The construction and the property of the image forming apparatus are qualitatively expressed using a cause-effect relation network of parameters (a parameter model) representing the property of the image forming apparatus.
(3) The qualitative values into which the values of the sensors are converted are applied to the parameter model to make qualitative simulation for fault diagnosis and fault repair inference.

More specifically, fault diagnosis and fault repair based on the qualitative model based system (QMS) are made.

In the self-diagnosis and self-repair system according to the prior application of the applicant having the foregoing features, even if the image forming apparatus develops a fault accompanied by, for example, the change in the construction, the fault can be flexibly coped with. The reason for this is that it is possible to dynamically change a control point and a control loop of the image forming apparatus by utilizing the qualitative simulation.

In order to operate the above described self-diagnosis and self-repair system according to the prior application as a practical built-in type system, however, it is necessary to reduce the scale of the system with respect to the fault diagnosis as well as to improve the execution speed with respect to the fault repair.

As one method, the inventors and the applicant of the present application have previously proposed a control device for making fault diagnosis using knowledge of virtual cases, to file patent applications (see seven applications, that is, Japanese Patent Application Nos. 4-66439 to 4-66445). If such knowledge of virtual cases is used, that is, virtual cases are used, it is not necessary to make the qualitative simulation by applying the qualitative values obtained from the image forming apparatus to the parameter model at the time of the fault diagnosis, thereby to make it possible to separate a fault diagnosis portion and a simulation portion from each other. Accordingly, the image forming apparatus may be only provided with a fault diagnosis portion storing virtual cases. Therefore, it is possible to reduce the capacity of the system for fault diagnosis carried in the image forming apparatus.

SUMMARY OF THE INVENTION

The present invention provides an image forming apparatus so adapted that not only fault diagnosis but also fault repair plan can be satisfactorily made using virtual cases by further expanding a fault diagnosis method using the virtual cases.

More specifically, an object of the present invention is to provide an image forming apparatus having a built-in type self-diagnosis and self-repair system which can make accurate fault diagnosis using virtual cases previously found by qualitative simulation and stored in a memory and automatically make fault repair by introducing a fault repair plan and is practical.

According to the present invention, the present state of the image forming apparatus is represented by fuzzy qualitative values, and the fuzzy qualitative values are compared with a plurality of virtual cases represented by qualitative values. The plurality of virtual cases are previously found by qualitative simulation and stored. Therefore, the fuzzy qualitative values and the virtual cases can be compared with each other in a short time only by reading out the virtual cases from case storage means, thereby to make it possible to diagnose the present state of the image forming apparatus in a short time.

Furthermore, when the image forming apparatus develops a fault as a result of the diagnosis, operation information for repair is read out from operation information storage means. This operation information storage means stores operation information previously found to correspond to each of a plurality of domains into which a qualitative quantity space which the image forming apparatus can take up is divided. Therefore, it is possible to obtain the most suitable operation information for repair by judging which of the domains obtained by the division is a domain to which the present state of the image forming apparatus belongs, thereby to make it possible to efficiently perform repair operations.

Additionally, if the state of the image forming apparatus is transferred from a domain to which the present state of the apparatus belongs to the other domain during the repair, repair operations based on operation information corresponding to the other domain may be performed, thereby to make it possible to efficiently perform the repair operations while considering the repair process.

Furthermore, according to the present invention, qualitative values representing the present state of the image forming apparatus which are detected by sensor means are converted into fuzzy qualitative values using fuzzy membership functions. In this case, when the detected values of the sensor means exist in a predetermined neutral space where the grades in the fuzzy membership functions take intermediate values, actuator means are forced to be operated so that the detected values of the sensor means go out of the neutral space. Therefore, the values of the sensor means which do not exist in the neutral space are converted into fuzzy qualitative values, thereby to obtain fuzzy qualitative values at which the present state of the image forming apparatus is easily diagnosed.

In accordance with another aspect of the present invention, operation information includes the contents of operations of actuators and a domain to which the state of the image forming apparatus can be transferred by the operations. Therefore, it is judged which of domains obtained by division is a domain to which the present state of the apparatus belongs, thereby to make it possible to obtain as operation information the judgment as to which of the domains is a domain to which the state of the apparatus is to be next transferred. Consequently, it is possible to efficiently make repair on the basis of the obtained operation information.

Furthermore, if the state of the image forming apparatus is transferred from a domain to which the present state of the apparatus belongs to the other domain during the repair, it is possible to read out, as operation information corresponding to the other domain, the contents of operations of an actuator to be operated and a domain to which the state of the apparatus may be transferred by the operations to further find out a domain to which the state of the apparatus is to be next transferred.

In accordance with still another aspect of the present invention, when the state of the image forming apparatus is transferred by making repair, it is confirmed that the transfer is consistent. Specifically, when the state of the apparatus is transferred to a domain to which the state of the apparatus cannot be theoretically transferred, it is considered that phenomena such as the decrease in the sensitivity of sensor means occur. However, it is confirmed that such phenomena do not occur.

In accordance with still another aspect of the present invention, in repair operation, the amount of one operation of each of actuators is so restricted that the state of the image forming apparatus is sequentially transferred from a domain to which the present state of the apparatus belongs to an adjacent domain. Consequently, fault repair can be reliably made while the state of the apparatus is gradually transferred to domains.

In accordance with still another aspect of the present invention, the goal domain is previously set, and repair operations are so performed that the state of the image forming apparatus is transferred to the goal domain. When fault repair is not completed and actuators reach the operation limit before the state of the apparatus is transferred to the goal domain, it is considered that the set goal domain is not appropriate, so that the goal domain is reset. Consequently, an approach for repair can be resumed from a different point of view.

In accordance with still another aspect of the present invention, there can be provided an image forming apparatus having a self-diagnosis function. If a fault symptom appears in the image forming apparatus, a fault which is the cause of the fault symptom can be self-diagnosed in a short time on the basis of virtual cases. In addition, it is conformed whether or not the state of the apparatus is transferred to a domain to which the state of the apparatus can be transferred which is presumed by operations of actuators as a result of self-diagnosis. Accordingly, it is possible to make correct self-diagnosis while confirming whether or not the sensitivity, for example, of sensors provided for the apparatus is not decreased.

Furthermore, according to the present invention, it is possible to quickly grasp a fault developed by the image forming apparatus on the basis of the virtual cases, thereby to make it possible to correctly repair the grasped fault by the operation information previously found.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 13 is a diagram showing existence patterns of respective values of sensors which exist in a neutral space in fuzzy qualitative values;

FIG. 15 is an image diagram showing processing for determining the distances from domains to which the state of the electrophotographic copying machine can be transferred to the goal domain;

FIG. 17 is a diagram showing images of an expansion plan 1 and an expansion plan 2 according to another embodiment of the present invention.

DESCRIPTION OF THE PREFERRED EMBODIMENTS

A small-sized electrophotographic copying machine capable of making self-diagnosis and self-repair will be described as one embodiment with reference to the drawings.

Figure 1:
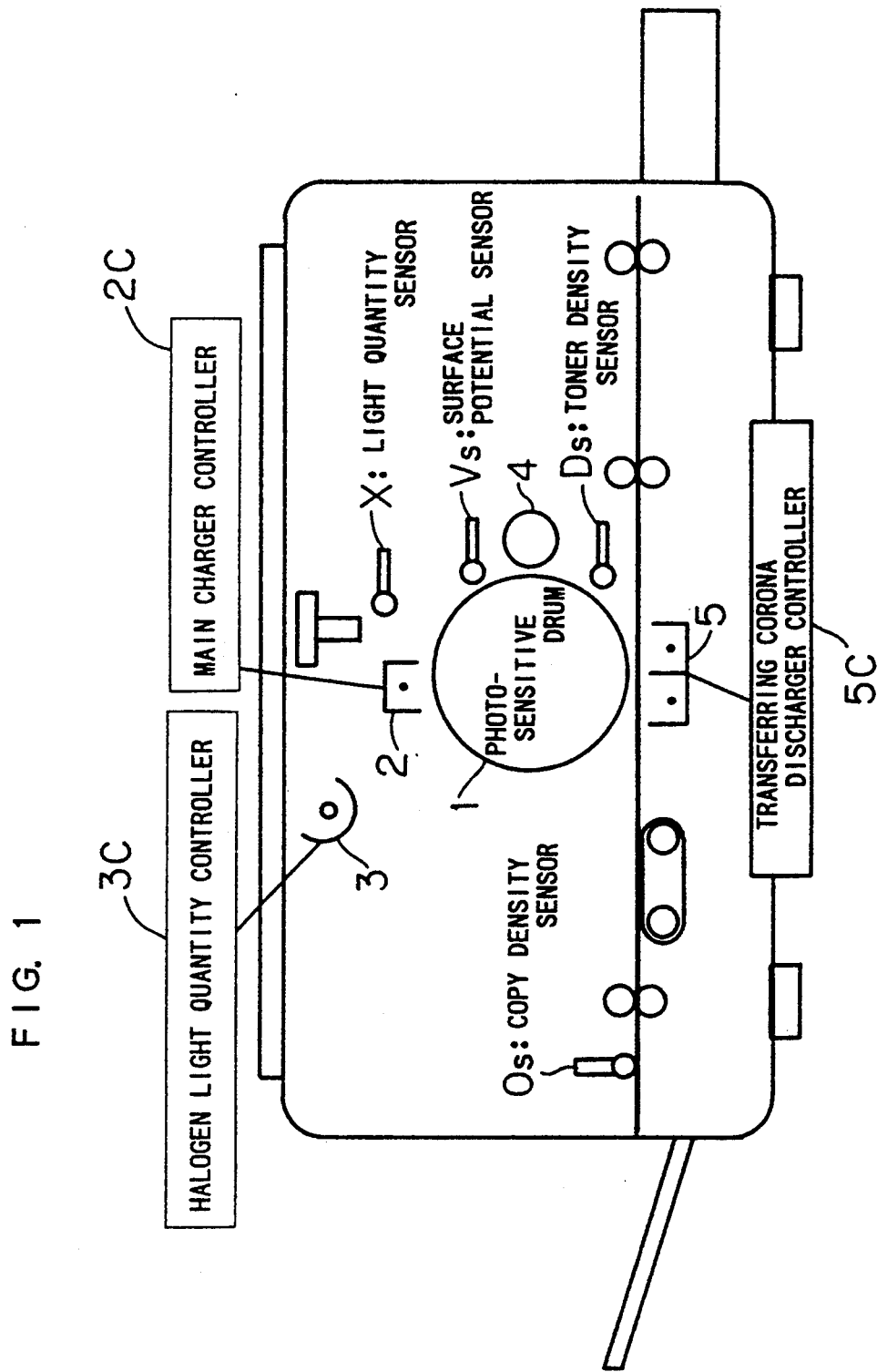
FIG. 1 is a diagram showing the mechanical construction of a small-sized electrophotographic copying machine according to one embodiment of the present invention.

FIG. 1 is a diagram showing the mechanical construction of a small-sized electrophotographic copying machine to which the present invention is applied, which illustrates only portions related to the present invention. In FIG. 1, reference numeral 1 denotes a photosensitive drum, reference numeral 2 denotes a main charger, reference numeral 3 denotes a halogen lamp for document illumination, reference numeral 4 denotes a developing device, and reference numeral 5 denotes a transferring and separating corona discharger.

A main charger controller 2C for changing a discharge voltage of the main charger 2 is connected to the main charger 2. In addition, a halogen light quantity controller 3C for controlling the quantity of light of the halogen lamp 3 is connected to the halogen lamp 3. Furthermore, a transferring corona discharger controller 5C for controlling a discharge voltage of the transferring and separating corona discharger 5, that is, a transfer voltage between the photosensitive drum 1 and copy paper is connected to the transferring and separating corona discharger 5.

In the electrophotographic copying machine, it is the most important to determine whether or not a copy image obtained is beautifully finished (normal). In the present embodiment, therefore, an electrophotographic copying machine capable of automatically determining whether the copy image obtained is normal, the image is fogged, or the image is lightly printed, diagnosing, if the copy image obtained is fogged or is lightly printed, the cause of such a symptom, that is, a fault, and self-repairing the fault will be described by way of example.

In the present embodiment, sensors, for example, four sensors are provided. Examples are a light quantity sensor X for measuring the quantity of light to which the photosensitive drum 1 is exposed, that is, the quantity of light of the halogen lamp 3, a surface potential sensor Vs for measuring a surface potential of the photosensitive drum 1 after the exposure, a toner density sensor Ds for detecting the toner density on the photosensitive drum 1, and a copy density sensor Os.

The copy density sensor Os is for detecting the density of the copy image formed by the electrophotographic copying machine. It is judged whether the electrophotographic copying machine is normal, the copy image is fogged as a fault symptom, or the copy image is lightly printed on the basis of a detection output Os of the copy density sensor Os.

Figure 3:
FIG. 3 is a diagram showing one example of reference values for fault judgment in the small-sized electrophotographic copying machine shown in FIG. 1.

More specifically, if the detection output Os of the copy density sensor Os is less than, for example, 2.5 (V), it is judged that the copy density is lowered, as shown in FIG. 3. In addition, if the detection output Os is not less than 2.5 (V) and less than 2.9 (V), it is judged that the copy density is normal. Furthermore, if the detection output Os is not less than 2.9 (V), it is judged that the copy image is fogged. This judgment is made in a diagnosis-repair inference portion 11 (as described later) constituted by, for example, a microcomputer provided for the electrophotographic copying machine.

Figure 2:
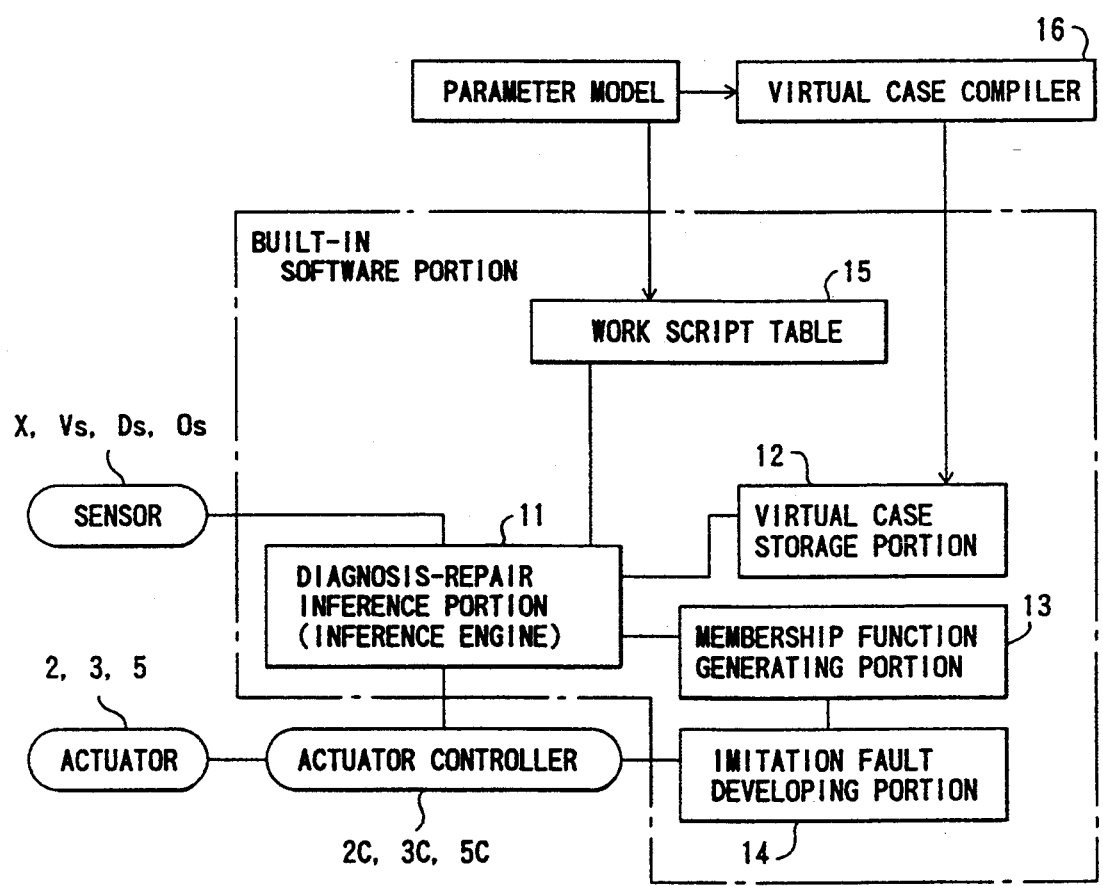
FIG. 2 is a diagram showing functional blocks of the small-sized electrophotographic copying machine shown in FIG. 1.

FIG. 2 is a block diagram showing functional blocks of the small-sized electrophotographic copying machine shown in FIG. 1, which illustrates only portions related to the present invention. In FIG. 2, a block with rounded corners represents a so-called hardware function, and a block with sharp corners represents a so-called software function (program processing executed in a computer). The division into the hardware function and the software function is one example. The software function may be realized by the hardware function.

The correspondence between the functional blocks shown in FIG. 2 and the mechanical construction shown in FIG. 1 is as follows. Specifically, a sensor shown in FIG. 2 comprises the light quantity sensor X, the surface potential sensor Vs, the toner density sensor Ds, and the copy density sensor Os shown in FIG. 1. An actuator controller shown in FIG. 2 comprises the main charger controller 2C, the halogen light quantity controller 3C, and the transferring corona discharger controller 5C shown in FIG. 1. An actuator shown in FIG. 2 comprises the main charger 2, the halogen lamp 3, and the transferring and separating corona discharger 5 shown in FIG. 1.

In FIG. 2, a software portion incorporated in the electrophotographic copying machine, that is, a software functional block comprises functional blocks, for example, five functional blocks. Examples are a diagnosis-repair inference portion (an inference engine) 11, a virtual case storage portion 12, a membership function generating portion 13, an imitation fault developing portion 14, and a work script table 15.

The virtual case storage portion 12 previously stores virtual cases created by a virtual case compiler 16 provided for, for example, an outer computer. The virtual cases are virtual state cases obtained as a result of previously making behavior simulation based on qualitative physics with respect to all faults which may occur and all operations of actuators in this electrophotographic copying machine.

Attempts to previously find the virtual cases by the virtual case compiler 16 and store the found virtual cases in the virtual case storage portion 12 allow the virtual case compiler 16 to be separated from the software portion incorporated in the electrophotographic copying machine. Specifically, if the virtual cases are stored, a fault diagnosis portion which must be incorporated in the electrophotographic copying machine and a simulation portion (the virtual case compiler 16) which need not be incorporated in the electrophotographic copying machine can be separated from each other, thereby to make it possible to reduce the capacity of a system carried in the electrophotographic copying machine.

Meanwhile, the virtual cases may be created in the virtual case compiler 16 using qualitative simulation described in, for example, the prior application of the applicant of the present application (Japanese Patent Laid-Open Gazette No. 4-130459).

Figure 4:
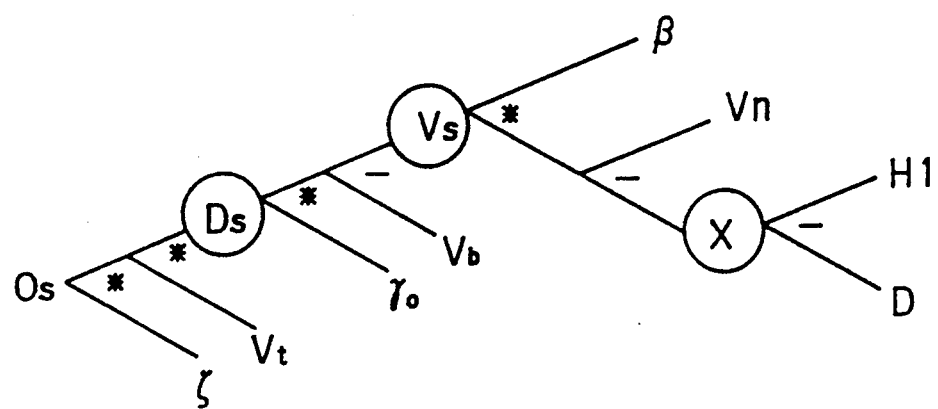
FIG. 4 is a diagram showing a simplified parameter model of the small-sized electrophotographic copying machine shown in FIG. 1.

A method of the qualitative simulation will be briefly described by way of precaution. When this electrophotographic copying machine is grasped from a physical point of view and is represented as a combination of a plurality of elements, and behaviors and attributes of the respective elements as well as the combinational relationship among the elements are represented qualitatively using parameters, a parameter model shown in, for example, FIG. 4 is obtained. The parameter model shown in FIG. 4 is a simplified model obtained by extracting only parameters related to a parameter of the copy density Os.

In the parameter model shown in FIG. 4,

Hl represents a parameter of the quantity of light of the halogen lamp 3,

D represents a parameter of the optical density of a document,

X represents a parameter of the quantity of light to which the photosensitive drum 1 is exposed, $\beta$ represents a parameter of the sensitivity of the photosensitive drum 1, Vn represents a parameter of a surface potential of the photosensitive drum 1 after main charging, Vs represents a parameter of a surface potential of the photosensitive drum 1 after exposure, Vb represents a parameter of a developing bias, $\gamma o$ represents a parameter of the toner sensitivity, Ds represents a parameter of the image density (toner density) on a drum, Vt represents a parameter of a transfer voltage, and $\zeta$ represents a parameter of the paper sensitivity.

The parameters D, $\beta$, $\gamma o$ and $\zeta$ out of the parameters are regarded as fixed values because they are not likely to vary. Therefore, it can be presumed that the change of the parameter of the copy density Os is caused by the change of any one of the parameters Hl, Vn, Vb and Vt. When any one of the four parameters Hl, Vn, Vb and Vt is changed to change the parameter Os, the change of the parameter Os inevitably changes the three sensing object parameters X, Vs and Ds (the parameters encircled in FIG. 4) (only when it is caused by the change of the parameter Vt, however, any of the parameters X, Vs and Ds is not changed).

The qualitative simulation for creating the virtual cases is for simulating the change of the parameter of the copy density Os, the changes of the four parameters Hl, Vn, Vb and Vt in a case where the parameter Os is changed and the changes of the sensing object parameters X, Vs and Ds on the parameter model shown in FIG. 4 to grasp the states of the sensing object parameters X, Vs and Ds as well as to grasp the states of the four parameters Hl, Vn, Vb and Vt which are to be the causes.

A method of creating the virtual cases on the basis of the above described qualitative simulation will be concretely explained using the parameter model shown in FIG. 4.

It is assumed that the copy density becomes abnormal, for example, an image is fogged. That is, it is assumed that the parameter Os becomes high (+). It is found that the cause of Os=high (+) is the change of Hl=low (−), Vn =high (+), Vb=low (−) or Vt=high (+) by the qualitative simulation or a combination of the changes on the parameter model shown in FIG. 4. The changes of the parameters Hl, Vn, Vb and Vt affect the sensing object parameters X, Vs and Ds on the parameter model. The reason for this is that if the parameters are changed to the degree to which the changes thereof do not affect the parameters, the parameter Os is not also changed as a result of the changes.

Therefore, a combination of the changes of the respective parameters changes the sensing object parameters X, Vs and Ds. The results of the simulation made to determine how the sensing object parameters X, Vs and Ds are changed on the basis of the changes of the parameters are virtual cases. The virtual cases will be shown in Table 1.

TABLE 1

| name of virtual case | image fog grade of parameter | | |
|---|---|---|---|
| | Ds | Vs | X |
| a | +1.0 | +1.0 | −1.0 |
| b | +1.0 | N 1.0 | −1.0 |
| c | N 1.0 | N 1.0 | −1.0 |
| d | N 1.0 | +1.0 | −1.0 |
| e | +1.0 | +1.0 | N 1.0 |
| f | +1.0 | N 1.0 | N 1.0 |
| g | N 1.0 | N 1.0 | N 1.0 |
| h | N 1.0 | +1.0 | N 1.0 |

Table 1 represents eight virtual cases a, b, c, d, e, f, g and h in a case where an image is fogged. Numerical values "1.0" respectively added to the states of the three sensing object parameters shown in Table 1 represent the grades of the parameters in membership functions in fuzzy inference as described later. The advantages, for example, of the introduction of the membership functions in the fuzzy inference will be described later.

The virtual cases exemplified in the foregoing Table 1 are previously created for each fault symptom by the qualitative simulation in the virtual case compiler 16, and are stored in the virtual case storage portion 12, as described above.

In the diagnosis-repair inference portion 11, the detection output Os of the copy density sensor Os is compared with the reference values for fault judgment shown in FIG. 3 as described above, to judge whether or not the image density is normal. If it is judged that the image density is abnormal, for example, it is judged that an image is fogged, the cause of a fault symptom "image fog" is presumed. That is, fault diagnosis is made. In the fault diagnosis, detected values obtained from the three sensors X, Vs and Ds are converted into qualitative values in the diagnosis-repair inference portion 11, and the qualitative values obtained by the conversion are compared with the 5 grades of the parameters listed in the fault symptom "image fog" shown in Table 1, to retrieve a virtual case having the highest degree of coincidence.

Meanwhile, when the detected values of the three sensors X, Vs and Ds are converted into the qualitative values, it is necessary to define a landmark on a qualitative quantity space. The landmark must be correctly determined. If the landmark is not correctly determined, the detected values are converted into the qualitative values on the basis of the incorrect landmark, thereby to make it impossible to correctly make the subsequent fault diagnosis and the like.

In the present embodiment, an imitation fault method (IF method) is introduced so as to determine the landmark, and a method of fuzzifying the qualitative values to dynamically determine the landmark is adopted.

Description is first made of membership functions used in converting detected values into qualitative values. The membership functions are stored in the membership function generating portion 13 shown in FIG. 2, and the membership functions are updated by the imitation fault developing portion 14 as described later.

Figure 5:
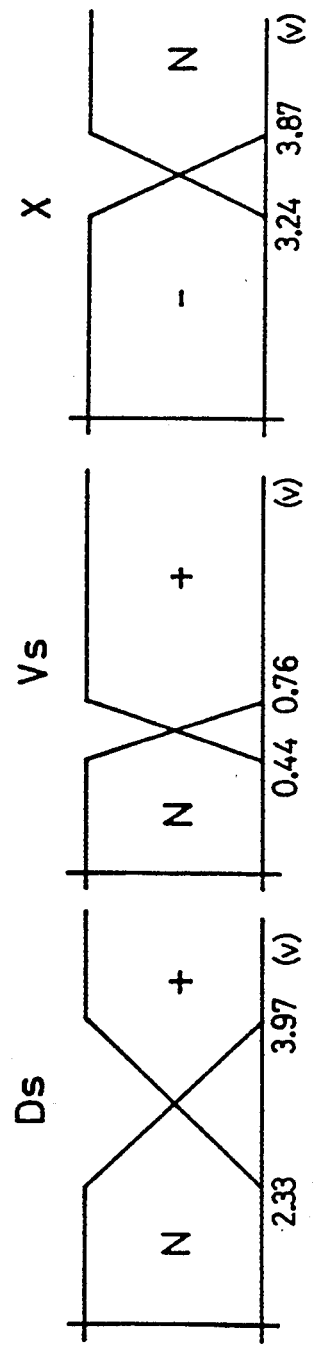
FIG. 5 is a diagram showing one example of fuzzy membership functions of Ds, Vs and X used when an image is fogged.

Fuzzy membership functions for converting the detected values of the toner density sensor Ds, the surface potential sensor Vs and the light quantity sensor X used at the time of a fault symptom "image fog" exemplified in FIG. 5 are stored in the membership function generating portion 13. It is known that the fuzzy membership function is a function for defining the degree (the grade) to which a certain element belongs to a certain set in the fuzzy theory.

In the diagnosis-repair inference portion 11, the detection output Os of the copy density sensor Os is compared with the reference values for fault judgment shown in FIG. 3. If the detection output Os is not less than, for example, 2.9 (V), it is judged that an image on copies is fogged.

If it is judged that an image is fogged, the respective detected values of the toner density sensor Ds, the surface potential sensor Vs and the light quantity sensor X at that time are converted into qualitative values on the basis of the fuzzy membership functions shown in FIG. 5 which are stored in the membership function generating portion 13.

For example, if the detected value of the toner density sensor Ds is a quantitative value and is less than 2.33 (V), it is converted into a qualitative value of Ds (N:1.0,+: 0.0).

If the detected quantitative value of the toner density sensor Ds is 2.82 (V), it is converted into a qualitative value of Ds (N:0.7,+:0.3).

Furthermore, if the detected quantitative value of the toner density sensor Ds is not less than 3.97 (V), it is converted into a qualitative value of Ds (N:0.0,+:1.0).

The detected quantitative value of the surface potential sensor Vs and the detected quantitative value of the light quantity sensor X are similarly converted into qualitative values on the basis of the fuzzy membership function of Vs and the fuzzy membership function of X shown in FIG. 5.

Description is now made of a method of generating the fuzzy membership functions.

Generally, it is necessary to define a landmark on a quantity space, as described above, so as to convert a detected quantitative value of a sensor into a qualitative value. If the change in the state caused by the use of the electrophotographic copying machine and the limit of the measurement precision of the sensor are considered, it is not easy to determine the landmark as static one. If the landmark is determined as static one and the determination is in error, the conversion of the value of the sensor into the qualitative value which is a premise of the control of the fault diagnosis and the fault repair according to the present embodiment is not accurately made, so that the possibility that the diagnosis and the repair are erroneously made becomes great.

In the present embodiment, therefore, landmarks are defined for each fault symptom, and the landmarks are respectively defined using fuzzy membership functions in the fuzzy theory.

If detected quantitative values of sensors are converted into qualitative values respectively using membership functions corresponding to a fault symptom, the reading errors of the sensors and the variation in outputs of the sensors due to, for example, the change in the environment in which the electrophotographic copying machine is used can be coped with flexibly and suitably.

Furthermore, if the fuzzy membership functions in the fuzzy theory are respectively introduced in converting the detected quantitative values of the sensors into the qualitative values, a problem concerning a correspondence between the measured quantitative values and the qualitative values which depends on, for example, the measurement precision of the sensors and the change in the environment in which the electrophotographic copying machine is used can be flexibly coped with, thereby to make it difficult to cause errors in converting the values of the sensors into the qualitative values.

The specific determination of the landmarks is made by a method of fuzzifying qualitative values and dynamically determining landmarks which is referred to as an imitation fault (IF) method. The IF method is a method of forcing the electrophotographic copying machine to develop a fault by operating actuators in the early stages before shipping the electrophotographic copying machine, after fault repair or at arbitrary timing based on manual input and dynamically determining landmarks respectively using sensor information at the time when the image forming apparatus is in a normal state before developing the fault and at the time when the image forming apparatus develops the fault.

If the IF method is used, the landmarks on the quantity space which are respectively required to convert the detected quantitative values of the sensors into the qualitative values can be dynamically determined for each electrophotographic copying machine which is an actual controlled object, thereby to make it possible to define the landmarks which respectively form the basis for the conversion into qualitative values with high precision for each electrophotographic copying machine.

Furthermore, if the IF method is used, landmarks defined when the electrophotographic copying machine is in an initial state can be corrected for each completion of fault repair, thereby to make it possible to always update the landmarks on the quantity space to suitable values in conformity with the change with age of the electrophotographic copying machine, the change in the environment in which the electrophotographic copying machine is used, and the like.

Figure 6:
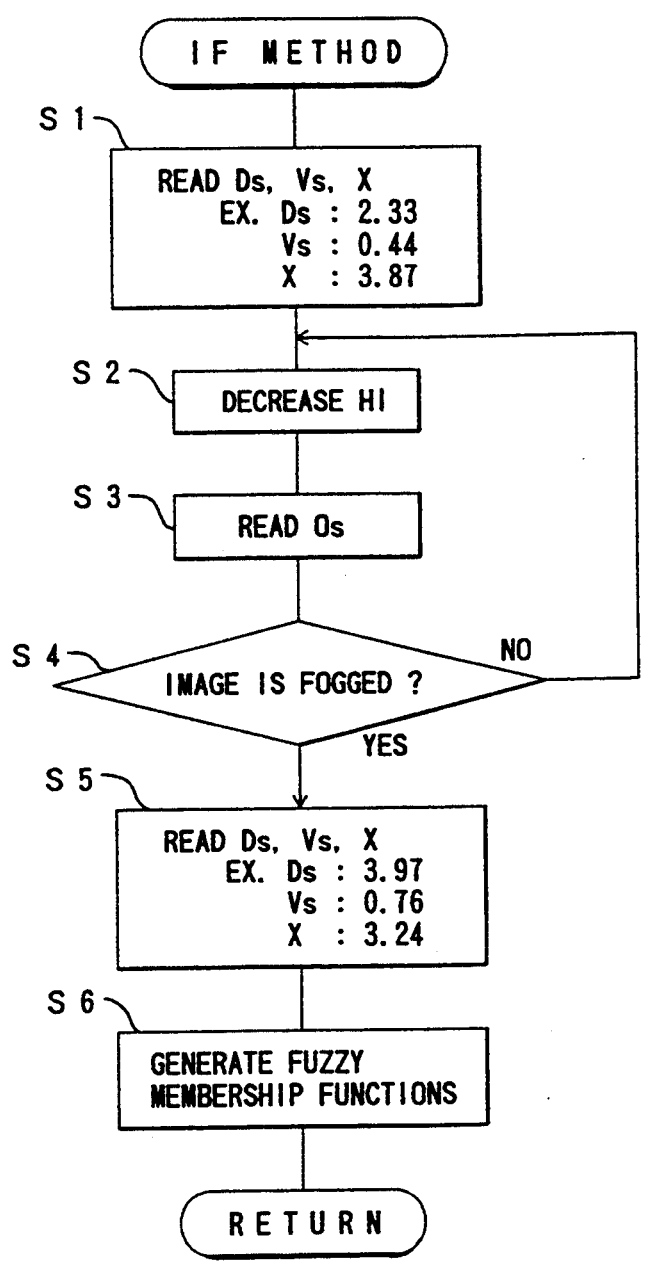
FIG. 6 is a flow chart showing one example of processing in an imitation fault method (IF method)

The IF method is carried out by the imitation fault developing portion 14 shown in FIG. 2. The contents of processing in the IF method will be concretely explained with reference to FIG. 6.

In the diagnosis-repair inference portion 11, the detected values of the toner density sensor Ds, the surface potential sensor Vs and the light quantity sensor X are first read (step S1). It is assumed that the read detected values of the respective sensors Ds, Vs and X are, for example, 2.33 (V), 0.4 (V) and 3.87 (V).

The halogen light quantity controller C3 is then operated by the imitation fault developing portion 14, to force the quantity of light of the halogen lamp 3 to be decreased (step S2). Every time the quantity of light of the halogen lamp 3 is decreased a very small quantity, the electrophotographic copying machine is caused to perform copying operations. The copy density obtained at that time is detected by the copy density sensor Os, and its detected value is read by the diagnosis-repair inference portion 11 (step S3). The detected value of the copy density sensor Os is checked with the above described reference values for fault judgment shown in FIG. 3 as previously described, so that processing for decreasing the quantity of light of the halogen lamp 3 is stopped when the value of the copy density sensor Os reaches a reference value at which an image is fogged (step S4).

The detected values of the toner density sensor Ds, the surface potential sensor Vs and the light quantity sensor X in a case where the quantity of light of the halogen lamp 3 is decreased until an image is fogged are read (step S5). It is assumed that the read detected values of the respective sensors Ds, Vs and X are, for example, 3.97 (V), 0.76 (V) and 3.24 (V).

The detected values of the sensors Ds, Vs and X which are read in the step S1 and the detected values of the sensors Ds, Vs and X at the time point where an image is fogged which are read in the step S5 are applied to the membership function generating portion 13, to respectively generate membership functions at the time when an image is fogged. Specifically, the values detected in the step S1 are regarded as landmarks at the time when an image is normal, and the values read in the step S5 are regarded as landmarks at the time point where an image starts to be fogged. The above described membership functions as shown in FIG. 5 are obtained as membership functions at the time when an image is fogged (step S6).

If the IF method is used, it is possible to dynamically update the landmarks in the electrophotographic copying machine for each, for example, fault repair, thereby to make it possible to define landmarks corresponding to the electrophotographic copying machine after the repair. In addition, even if the electrophotographic copying machine is changed with age due to the long-term use, the landmarks can be dynamically updated as the electrophotographic copying machine is changed with age, thereby to always convert quantitative values detected by the respective sensors into qualitative values on the basis of the most suitable landmarks.

Meanwhile, in the fault diagnosis based on virtual cases, the result is given as the order of coincidence priorities assigned to the virtual cases. For example, when a fault symptom "image fog" appears, the eight virtual cases a, b, c, d, e, f, g and h shown in the foregoing Table 1 are assigned properties.

Figure 7:
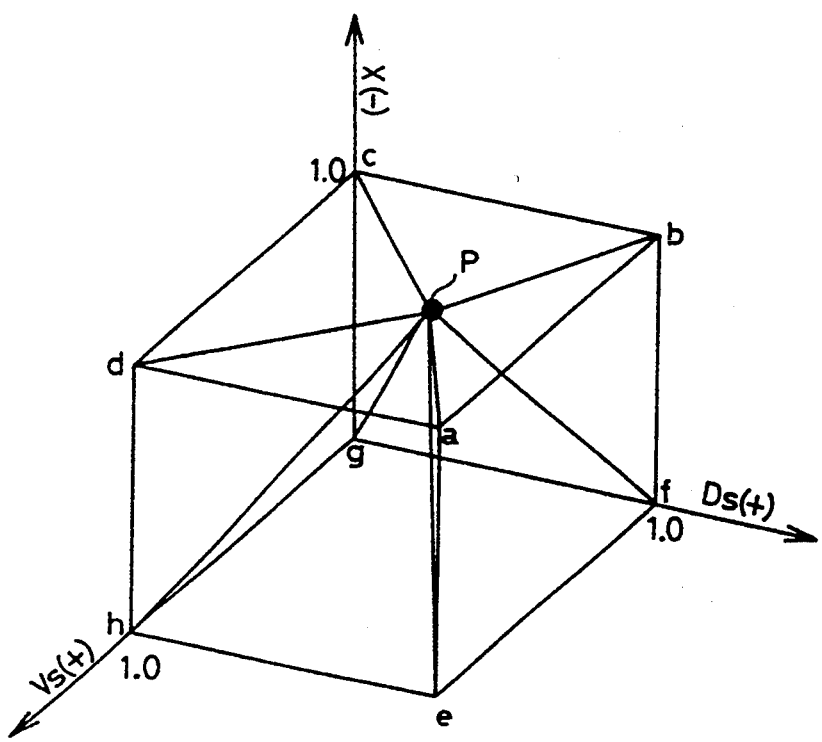
FIG. 7 is an image diagram showing the distances from a position p of the present state of the electrophotographic copying machine to respective virtual cases a to h in a fault symptom "image fog"

The eight virtual cases a to h can be represented in a three-dimensional quantity space of grades of the three sensing object parameters Ds, Vs and X. This three-dimensional quantity space is shown in FIG. 7. In FIG. 7, eight vertexes of a cube respectively represent the states of the eight virtual cases shown in Table 1. Since the result of the fault diagnosis based on the virtual cases is given as the order of coincidence priorities assigned to the eight virtual cases, as described above, it is possible to divide a state space which the electrophotographic copying machine can take up into domains in the order of coincidence priorities assigned to the virtual cases, that is, the order of cases.

Table 2 shows the list of domains and the orders of cases in a case where the state space which the electrophotographic copying machine can take up in the fault symptom "image fog" is divided into 96 domains.

TABLE 2

| Division of fog space into domains | |
|---|---|
| domain N | order of cases |
| A - 1 | abdcefhg |
| A - 2 | abdecfhg |

TABLE 2-continued

| Division of fog space into domains | |
|---|---|
| domain N | order of cases |
| A - 3 | abedfchg |
| ⋮ | ⋮ |
| A - 48 | dhcgaebf |
| A - 49 | eafbhdgc |
| ⋮ | ⋮ |
| A - 95 | hgedfcab |
| A - 96 | hgefdcab |

The order of cases in each of the domains represents the state where the function of the electrophotographic copying machine is developed. Specifically, it is possible to find which of the virtual cases is a virtual case to which the state where the function of the electrophotographic copying machine is developed, which is obtained as a result of the fault diagnosis, is the closest, which of the virtual cases is a virtual case to which it is the next closest, which of the virtual cases is a virtual case to which it is further the next closest, . . . . , which of the virtual cases is a virtual case from which it is the farthest. Consequently, domain information is used for a repair plan, thereby to make it possible to set the goal state for repair depending on the state where the function of the electrophotographic copying machine is developed. In the repair, a function to be paid attention to may be developed. Accordingly, it is possible to examine whether or not a compromise can be reached even if functions other than the function to be paid attention to are not developed. Specifically, it is possible to realize the function trade-off concerning repair.

The list of the domains obtained by the division and the orders of cases shown in Table 2 is previously stored in the virtual case storage portion 12 shown in FIG. 2. Similarly, the space which the electrophotographic copying machine can take up is previously divided into domains to find the orders of cases in the respective domains, and the domains and the orders of cases are stored with respect to each of fault symptoms other than the fault symptom "image fog".

The number of domains obtained by division is determined by the number of sensing object parameters, and is further determined depending on how many virtual cases from the highest priority virtual case in the order of coincidence priorities assigned to the virtual cases given as a result of the fault diagnosis are considered to be significant. The order of coincidence priorities assigned to the virtual cases which are considered to be significant directly affects the success or the failure of the repair. Accordingly, it is necessary to previously determine the order of coincidence priorities assigned to the significant virtual cases depending on, for example, the precision of the sensors in the system prior to the repair. In the present embodiment, the order of coincidence priorities assigned to the significant virtual cases is referred to as "resolution of diagnosis". The maximum number of domains obtained by division N in, for example, a case where an object machine comprises n sensors and all virtual cases in the order of coincidence priorities assigned to virtual cases are considered to be significant is given by the following equation (1) when qualitative values to be simultaneously considered are limited to two (two qualitative values are, for example, +(plus) and N(normal), another example, −(minus) and N(mormal)):

$$N = 2^n \times {}_nP_2 \times \prod_{r=2}^{n-1}\left((n-r) + \sum_{k=2}^{r} {}_rC_k\right) \quad (1)$$

(where n≧3)

More specifically, in the present embodiment, there are three sensors Ds, Vs and X. A qualitative quantity space of the three sensors can be divided into domains A-1 to A-96 as shown in Table 2 because the maximum number of domains obtained by division is 96 if the qualitative values are limited to two (+/N or −/N).

It will be more concretely explained that the qualitative quantity space is divided into 96 domains.

Consider a cube in a three-dimensional quantity space shown in FIG. 7. In this case, eight virtual cases are positioned at respective vertexes of the cube. Therefore, the virtual case assigned the first priority is selected from the virtual cases positioned at the eight vertexes of the cube, that is, there are eight ways of selecting the virtual case assigned the first priority. For example, it is assumed that the virtual case a is selected as the virtual case assigned the first priority. Consequently, the virtual case assigned the second priority is selected from the three virtual cases b, d and e positioned at the vertexes close to the virtual case assigned the first priority a, that is, there are three ways of selecting the virtual case assigned the second priority. In addition, the virtual case assigned the third priority is selected from the remaining two virtual cases which are not selected out of the virtual cases b, d and e which may be selected as the above described virtual case assigned the second priority. Furthermore, the virtual case assigned the fourth priority is selected from the virtual case which is not selected out of the above described three virtual cases b, d and e and the virtual case c.

If the virtual case a is determined as the virtual case assigned the first priority, the virtual case g at the vertex opposed to the virtual case a is determined as the virtual case assigned the eighth priority. Similarly, if the virtual cases assigned the second to fourth priorities are determined, the virtual cases assigned the seventh to fifth priorities are also determined. Therefore, the three-dimensional quantity space can be eventually divided into 8 ×3×2×2=96 domains.

Description is now made of a work script stored in the work script table 15 (see FIG. 2).

Domains obtained by division in the order of cases include a domain to which the state of the object machine can be transferred and a domain to which the state of the object machine cannot be transferred depending on the property of the object machine. The transition rule can be derived from the cause-effect relation between parameters of the electrophotographic copying machine which is the object machine and the structures of actuators, and can be used for a repair plan of the electrophotographic copying machine.

Figure 8:
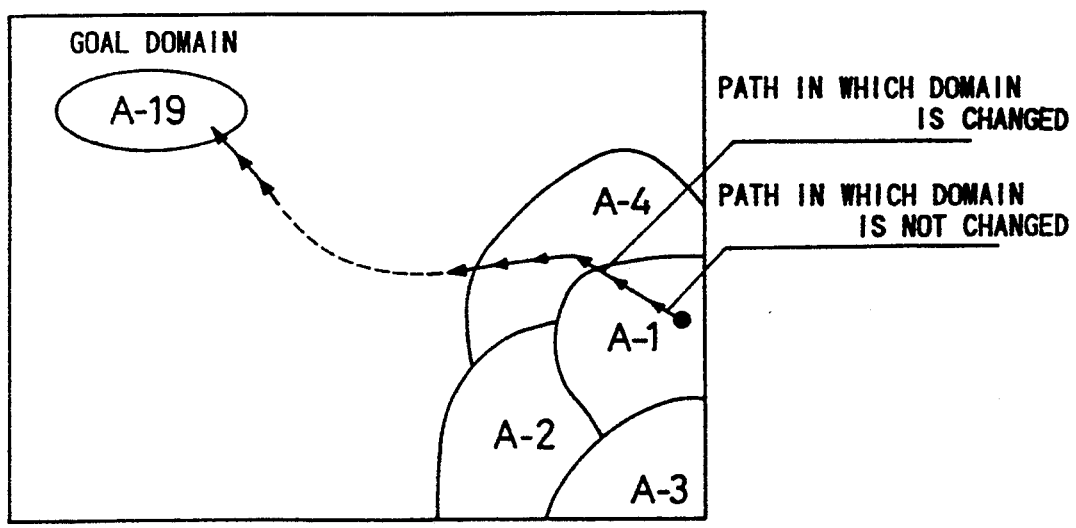
FIG. 8 is an illustration showing the relationship between a transition rule and paths in the repair process.

FIG. 8 is a schematic diagram showing a representation of the three-dimensional quantity space shown in FIG. 7 by a two-dimensional quantity space and an illustration showing the relationship between the above described transition rule and paths in the repair process. Description is made with reference to FIG. 8. Suppose a domain to which the present state of the electrophotographic copying machine belongs is, for example, A-1, and the goal domain which is to be the goal of repair is A-19. In this case, actuators may be operated while retrieving a path from the domain A-1 to the goal domain A-19 and monitoring the order of coincidence priorities assigned to virtual cases so that the state of the electrophotographic copying machine is transferred through the path. Knowledge representing the relationship between the contents of the operations of the actuators and the transfer of the state of the copying machine is a work script. The actual repair is made by considering the work script as a minimum unit operation.

Table 3, Table 4, Table 5 and Table 6 show examples of the work script.

TABLE 3 work script A - 1

| operation | domain | operation | domain | operation | domain |
| --- | --- | --- | --- | --- | --- |
| increase in halogen light quantity (H1) | A-4 | increase in prinicipal charge voltage (Vn) | A-3 Ds__max | increase in developing bias voltage (Vb) | A-2 |
| decrease in halogen light quantity (H1) | X__max Ds__max | decrease in principal charge voltage (Vn) | A-4 | decrease in developing bias voltage (Vb) | Ds__max |

TABLE 4 work script A - 4

| operation | domain | operation | domain | operation | domain |
| --- | --- | --- | --- | --- | --- |
| increase in halogen light quantity (H1) | A-5 A-6 | increase in prinicipal charge voltage (Vn) | A-1 Ds__max | increase in developing bias voltage (Vb) | A-5 |
| decrease in halogen light quantity (H1) | A-1 Ds__max X__max | decrease in principal charge voltage (Vn) | A-5 A-6 | decrease in developing bias voltage (Vb) | Ds__max |

TABLE 5 work script A - 19

| operation | domain | operation | domain | operation | domain |
| --- | --- | --- | --- | --- | --- |
| increase in | Vs__min | increase in | A-20 | increase in | Ds__min |

TABLE 5-continued

| | | work script A - 19 | | | |
|---|---|---|---|---|---|
| operation | domain | operation | domain | operation | domain |
| halogen light quantity (H1) | Ds_min | principal charge voltage (Vn) | A-21 | developing bias voltage (Vb) | |
| decrease in halogen light quantity (H1) | A-9 | decrease in principal charge voltage (Vn) | Ds_min Vs_min | decrease in developing bias voltage (Vb) | A-20 |

TABLE 6

| | | work script A - 24 | | | |
|---|---|---|---|---|---|
| operation | domain | operation | domain | operation | domain |
| increase in halogen light quantity (H1) | A-21 X_min Ds_min | increase in prinicipal charge voltage (Vn) | A-22 A-23 | increase in developing bias voltage (Vb) | Ds_min |
| decrease in halogen light quantity (H1) | A-22 A-23 | decrease in principal charge voltage (Vn) | A-21 Ds_min | decrease in developing bias voltage (Vb) | A-25 |

As shown in Table 3 to Table 6, the work script is set for each domain. Table 3 to Table 6 show certain operations and domains to which the state of the electrophotographic copying machine can be transferred by the operations.

For example, as described in the work script for the domain A-1 shown in Table 3, if the halogen light quantity (the parameter H1) is increased as an operation, the state of the electrophotographic copying machine may be transferred to a domain A-4. On the other hand, if the halogen light quantity (parameter H1) is decreased as an operation, the grade of the parameter of the quantity of light X is the largest or the grade of the parameter of the toner density Ds is the largest.

Furthermore, as described in the work script, the state of the electrophotographic copying machine can be transferred to a domain A-3 or the parameter Ds may be the largest if the principal charge voltage (the parameter Vn) is increased as an operation, the state of the copying machine can be transferred to a domain A-4 if the principal charge voltage (the parameter Vn) is decreased as an operation, the state of the copying machine can be transferred to a domain A-2 if the developing bias voltage (the parameter Vb) is increased as an operation, and the parameter Ds may be the largest if the developing bias voltage (parameter Vb) is decreased as an operation.

Additionally, not only the type of operation, for example, an operation of increasing the halogen light quantity (the parameter H1) but also the amount of the operation may be described in the work script. The amount of the operation may be preferably the amount of one operation in which the state of the electrophotographic copying machine is transferred as described later.

In the repair process described in FIG. 8, the halogen light quantity (the parameter H1) is first increased, for example, in the domain A-1 on the basis of the work script A-1 shown in Table 3. As a result, if the state of the electrophotographic copying machine is transferred to the domain A-4, operations based on the work script A-4 shown in Table 4 are performed.

As described in the foregoing, a corresponding work script is stored for each of domains obtained by division in the work script table 15 (see FIG. 2).

The work scripts stored in the work script table 15 are prepared by simulation on the basis of the parameter model shown in FIG. 4.

If the work script table 15 is provided to previously store work scripts, a work script need not be prepared on the basis of the parameter model every time the electrophotographic copying machine develops a fault, thereby to make it possible to miniaturize the copying machine. In addition, a work script need not be prepared for each fault repair, thereby to make it possible to shorten time required for fault repair.

Figure 9:
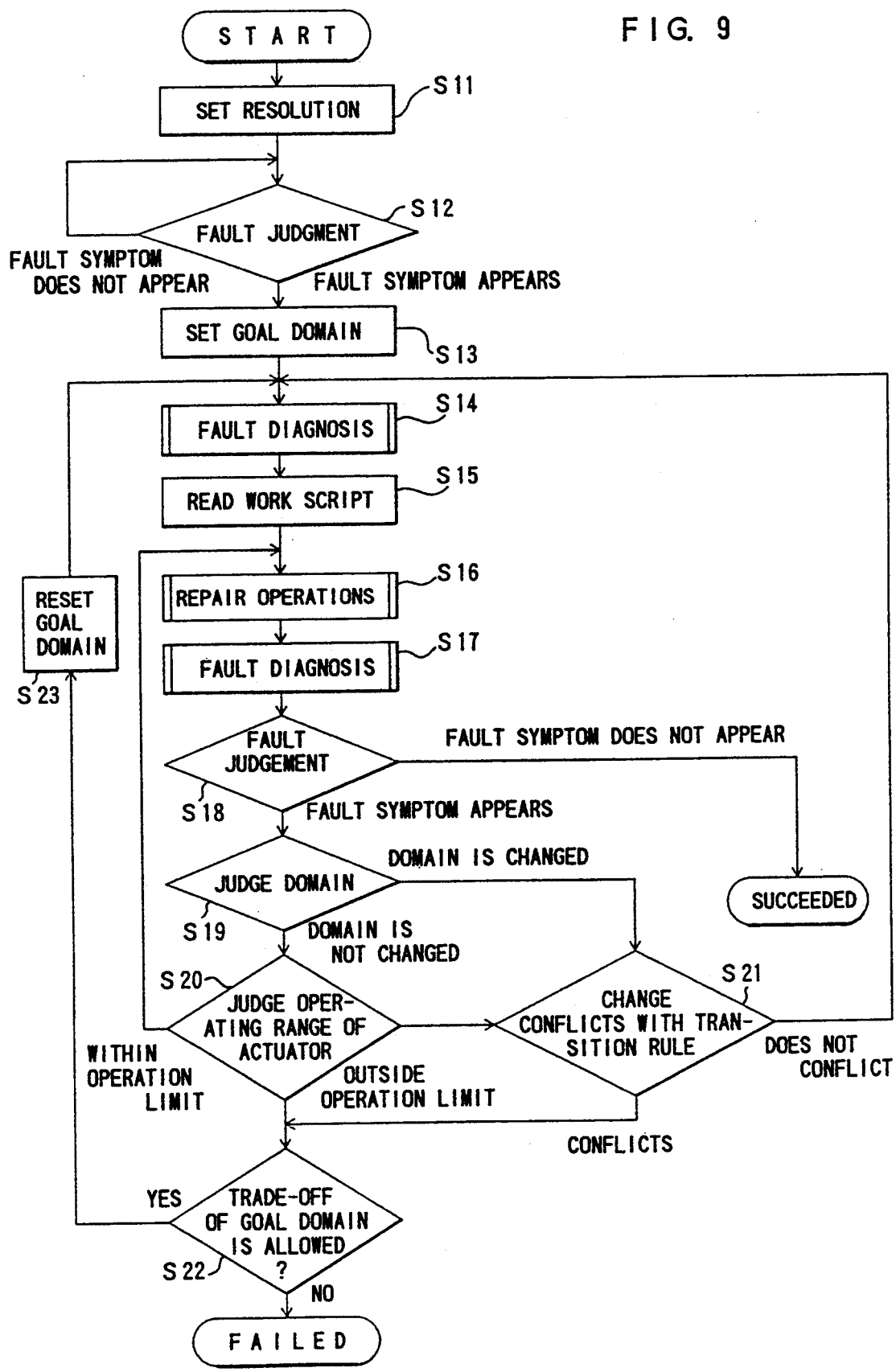
FIG. 9 is a flow chart showing the entire procedure of control carried out in a fault-repair inference portion in an electrophotographic copying machine according to the present embodiment.

FIG. 9 is a flow chart showing the procedure of control carried out in the software portion incorporated in the electrophotographic copying machine and particularly, the diagnosis-repair inference portion 11 shown in FIG. 2. Description is now made of fault diagnosis and fault repair processing in the electrophotographic copying machine along the flow of FIG. 9.

The flow chart shown in FIG. 9 includes processing which is not performed automatically on the basis of a predetermined program but manually. Specifically, processing for setting the resolution in the step S11, processing for setting the goal domain in the step S13, processing for judging whether or not the trade-off of the goal domain is allowed in the step S22, and processing for resetting the goal domain in the step S23 are manually performed.

If the processing is started, "resolution of diagnosis" is first set (step S11). The setting of "resolution of diagnosis" is to determine the order of coincidence priorities assigned to significant virtual cases which forms the basis in dividing a state space into domains, as previously described. In the present embodiment, if the eight virtual cases a to h are assigned coincidence priorities, the order of the virtual cases assigned the third to sixth priorities shall not be considered. Therefore, the state space is divided into 24 domains, as shown in Table 7, on the basis of the virtual cases assigned the first, second, seventh and eighth priorities out of the eight virtual cases.

TABLE 7

Example of abstraction of domains obtained by division based on setting of resolution

| domain No. | order of cases |
|---|---|
| A - 1 | ab****hg |
| A - 2 | ab****fg |
| A - 3 | ae****cg |
| A - 4 | ba****gh |
| ⋮ | ⋮ |
| A - 15 | ea****gc |
| A - 16 | ef****dc |
| ⋮ | ⋮ |
| A - 19 | gc****ea |
| ⋮ | ⋮ |
| A - 23 | he****cb |
| A - 24 | hg****ab |

In Table 7, virtual cases assigned a "*" mark are virtual cases whose order is not considered.

Meanwhile, the resolution may be set depending on, for example, the precision of the sensors in the system, as described above. Although in the present embodiment, the state space is divided into 24 domains as a result of setting the resolution as described above, the number of domains obtained by division can be increased or decreased by a method of setting the resolution, provided that the maximum number of domains obtained by division is not more than 96.

If the resolution is set, fault judgment is then made (step S12). The detected value of the copy density sensor Os is read by the diagnosis-repair inference portion 11, and the read copy density Os is compared with the reference values for fault judgment shown in FIG. 3, thereby to make the fault judgment.

Although in the present embodiment, the fault judgment processing in the step S12 is automatically performed in the diagnosis-repair inference section 11, it may be manually performed.

When the fault judgment is manually made, the copy density sensor Os need not be provided. In the manual processing, a service man or the like may judge that an image on copies outputted from the electrophotographic copying machine is fogged by viewing the copies. In the case, the fact that an image is fogged is inputted as a fault symptom to the copying machine. The fault symptom may be inputted by a ten-key and the like usually provided for the electrophotographic copying machine after, for example, changing the electrophotographic copying machine into a fault diagnosis mode.

If the fault symptom is judged in the step S12 to judge that "image fog", for example, occurs as a fault symptom, the goal domain is then set (step S13).

The setting of the goal domain is to set any one of domains, for example, 24 domains obtained by division as a result of the setting of the resolution in the step S11 as the final goal domain to which the state of the electrophotographic copying machine is transferred. This goal domain is manually set.

Fault diagnosis is then made (step S14). A detailed subroutine for fault diagnosis processing in the step S14 is shown in FIG. 10.

Figure 10:
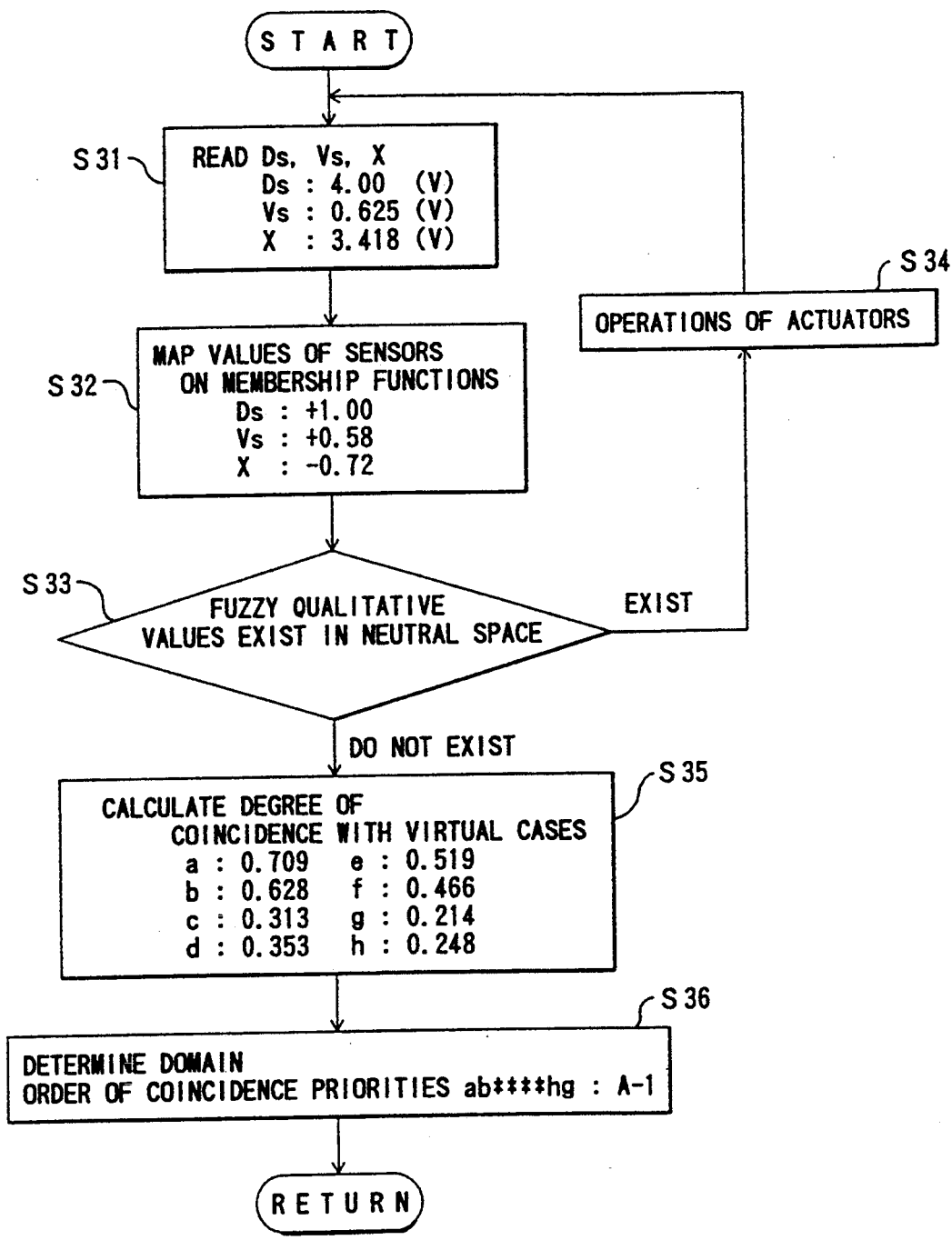
FIG. 10 is a flow chart showing the specific contents of fault diagnosis processing.

Referring now to FIG. 10, the fault diagnosis processing will be concretely explained.

The detected values of the toner density sensor Ds, the surface potential sensor Vs and the light quantity sensor X are first read in the diagnosis-repair inference section 11 (step S31). It is assumed that the read detected quantitative values of the respective sensors Ds, Vs and X are respectively 4.00 (V), 0.625 (V) and 3.418 (V). The read quantitative values of the respective sensors are applied to the fuzzy membership functions at the time of "image fog" (see FIG. 5) stored in the membership function generating portion 13 and are converted into fuzzy qualitative values (step S32).

In the concrete example, Ds:4.00, Vs:0.625, and X: 3.418 are respectively applied to the fuzzy membership functions shown in FIG. 5, to obtain Ds:+1.00, Vs:+0.58 and X:−0.72 (step S32).

It is then judged whether or not the fuzzy qualitative values obtained exist in the neutral space (step S33).

Figure 11:
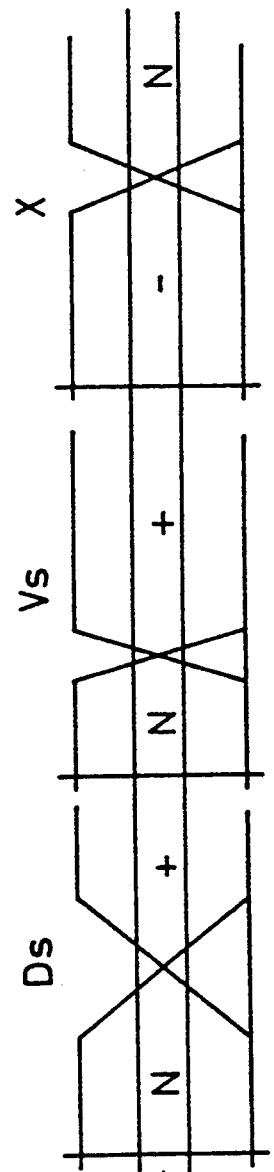
FIG. 11 is a diagram for explaining a neutral space in fuzzy qualitative values.

A case where the fuzzy qualitative values exist in the neutral space means a case where the grades of two or more fuzzy qualitative values out of the three fuzzy qualitative values Ds, Vs and X exist in a predetermined intermediate domain (neutral space), as shown in FIG. 11. In a case where the fuzzy qualitative values exist in the neutral space, it is difficult to accurately find the result of the fault diagnosis. More specifically, the case where the fuzzy qualitative values exist in the neutral space means a case where the values of the sensors are in a place where a lot of domains are concentrated in the three-dimensional quantity space. When the value of the sensor enters the place where a lot of domains are concentrated, therefore, a domain to which the value of the sensor belongs differs depending on an error in the detected value of the sensor and the precision of the sensor. Therefore, it is difficult to accurately find a domain to which the state of the electrophotographic copying machine belongs, so that the subsequent repair operations may not be accurately performed. In the present embodiment, therefore, operations of the actuators are performed (step S34 in FIG. 10), to perform processing so that no fuzzy qualitative values exist in the neutral space.

Figure 12:
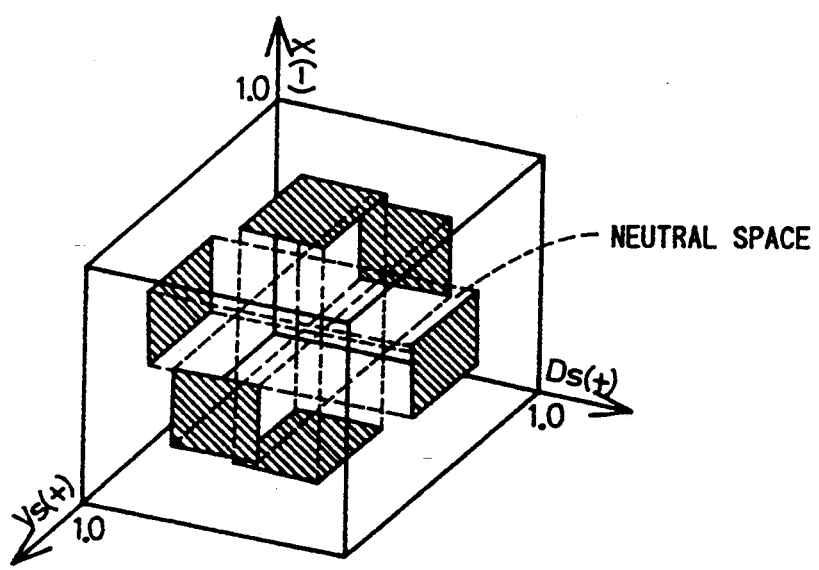
FIG. 12 is a diagram for explaining a neutral space which is visualized in a three-dimensional quantity space in fuzzy qualitative values.

FIG. 12 is a diagram showing a neutral space visualized in a three-dimensional quantity space. In the three-dimensional quantity space shown in FIG. 13, a three-dimensional cross space indicated by a one-dot and dash line which is positioned in the center of a cube is the neutral space.

If only the large or small relationship between the grades of the respective values of the sensors which are converted into fuzzy qualitative values is paid attention to, there are six patterns, that is, a pattern 1 to a pattern 6 shown in FIG. 13 as existence patterns of the respective values of the sensors which exist in the neutral space. In addition, the conditions under which the values of the sensors exist in the neutral space are that the values of two or more sensors exist in the width of the neutral space. Therefore, three states are considered for each pattern shown in FIG. 13. Consequently, there are 6×3=18 combinations of the values of the sensors which exist in the neutral space. In the present embodiment, processing is so performed that the values of the sensors earliest go out of the neutral space in the operations of the actuators (step S34) shown in FIG. 10.

Examples of the operations of the actuators in the step S34 shown in FIG. 10 are as follows.

For example, when the grades of the values of the sensors are in the form of a pattern 1 shown in FIG. 13 and Ds and Vs belong to the width of the neutral space, Vs (an output voltage of the main charger) is decreased as an operation of an actuator.

When the grades of the values of the sensors are in the form of a pattern 1 shown in FIG. 13 and X and Vs belong to the width of the neutral space, Hl (the quantity of light of the halogen lamp) is decreased as an operation of an actuator.

Furthermore, when the grades of the values of the sensors are in the form of a pattern 1 shown in FIG. 13 and Ds, Vs and X belong to the width of the neutral space, Hl (the quantity of light of the halogen lamp) is decreased as an operation of an actuator.

The operations of the actuators are determined on the basis of, for example, the parameter model shown in FIG. 4.

Turning to FIG. 10, when the fuzzy qualitative values do not exist in the natural space in the step S33, or when as a result of performing the operations of the actuators in the step S34 to read the values of the sensors and convert the values of the sensors into the fuzzy qualitative values (steps S31 and S32), the fuzzy qualitative values do not exist in the neutral space, the degrees of coincidence C between the fuzzy qualitative values found and the virtual cases are calculated (step S35). The degrees of coincidence C are calculated in the following manner.

First, the qualitative values Ds:+1.00, Vs:+0.58, and X:−0.72 found in the step S32 are in the position p indicated by a black circle in the three-dimensional quantity space shown in FIG. 7.

The distances D (Da to Dh) from the point p to the virtual cases a to h (the vertexes of the cube in the three-dimensional quantity space shown in FIG. 7) are then calculated, and the calculated distances D are normalized, thereby to calculate the degrees of coincidence C. The degrees of coincidence C are calculated by the following equations (2), (3) and (4):

$$C = 1 - D/\sqrt{n} \qquad (2)$$

(where n is the number of sensing object parameters: n=3 in this case)

$$C = 1 - \sqrt{C(p1)^2 + C(p2)^2 + \ldots + C(pn)^2} / \sqrt{n} \qquad (3)$$

$$C(pn) = Gm(qn) - Gs(qn) \qquad (4)$$

(where C: the degree of coincidence in the entire model, pn: a variable which can be measured, C(pn): the degree of coincidence with respect to the variable pn, qn: a qualitative value which the variable pn can take, Gm(qn): the grade of the qualitative value qn in a fault model, and Gs(qn): the grade of the qualitative value qn in the measured value).

As a result of the calculation, the degrees of coincidence C (Ca to Ch) between the qualitative values found in the step S32 and the eight virtual cases a to h are calculated. The results of the calculations are as follows:

Ca:0.709
Cb:0.628
Cc:0.313
Cd:0.353
Ce:0.519
Cf:0.466
Cg:0.214
Ch:0.248

The results of the calculations are arranged in descending order of the degrees of coincidence, thereby to determine a domain to which the present state of the electrophotographic copying machine belongs (step S36). In the determination of the domain, the resolution is set, as described in FIG. 9. Specifically, the domain is determined on the basis of the four degrees of coincidence, that is, the largest degree of coincidence, the second largest degree of coincidence, the second smallest degree of coincidence and the smallest degree of coincidence.

In the present embodiment, the order of coincidence priorities assigned to the virtual cases is "ab****hg", so that a domain A-1 is determined.

Turning to FIG. 9, if the above described fault diagnosis is made in the step S14, to determine a domain, a work script corresponding to the domain is read out from the work script table 15 (see FIG. 2). In the present embodiment, a work script A-1 (see Table 3) corresponding to the domain A-1 is read out (step S15).

Repair operations are performed on the basis of the work script A-1 read out (step S16).

Specific processing of the repair operations performed in the step S16 will be described on the basis of a subroutine shown in FIG. 14.

Figure 14:
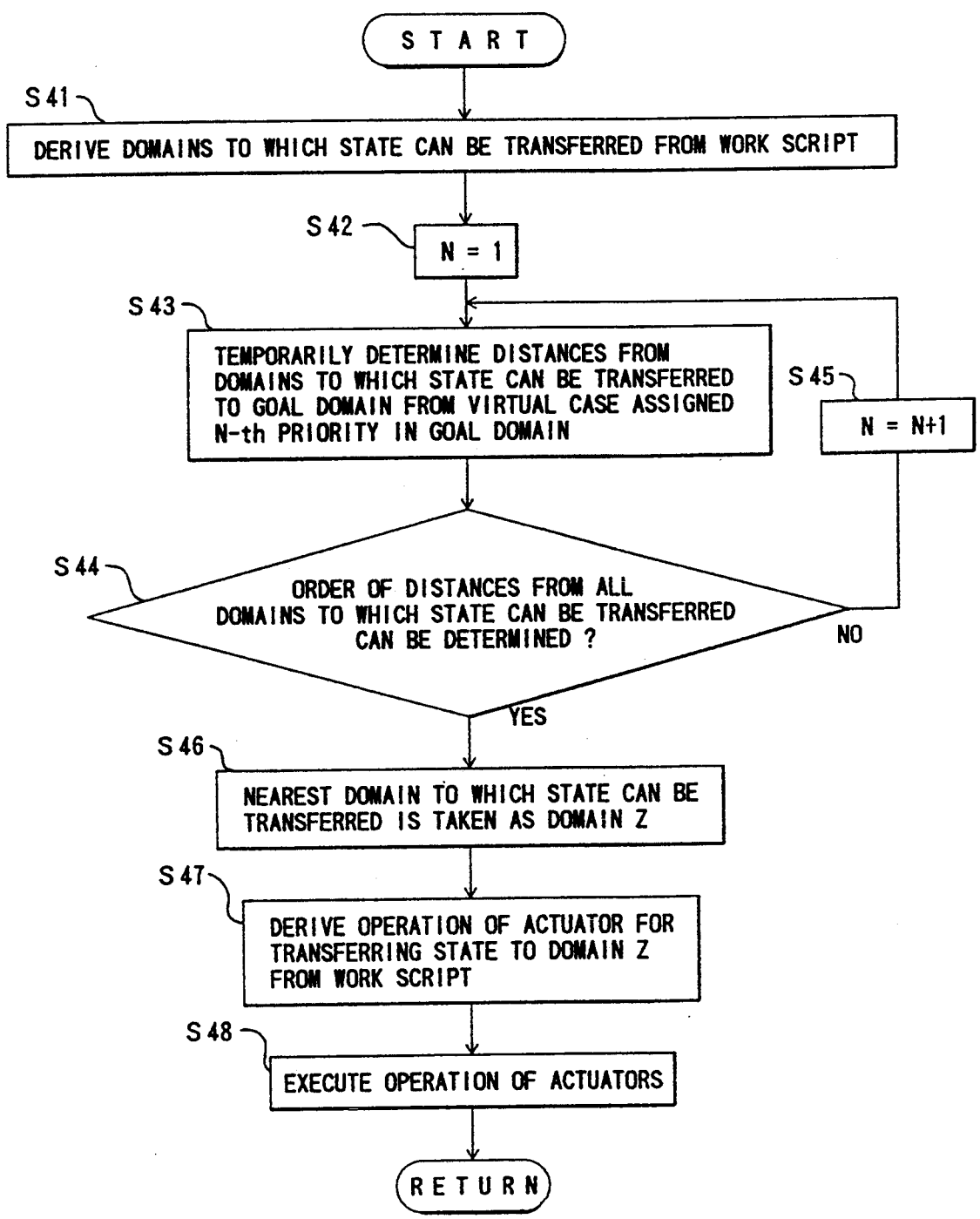
FIG. 14 is a flow chart showing the specific contents of processing in repair operations.

Referring to FIG. 14, all domains to which the state of the electrophotographic copying machine can be transferred are derived from the work script A-1 (see Table 3) read out in the step S15 shown in FIG. 9. In this case, domains A-2, A-3 and A-4 are described as the domains to which the state of the copying machine can be transferred in the work script A1. The three domains A-2, A-3 and A-4 and the domain A-1 to which the present state of the copying machine belongs are derived (step S41).

A counter N is then set to 1 (step S42) and then, the distances from the domains to which the state of the electrophotographic copying machine can be transferred to the goal domain are temporarily determined from a virtual case assigned the N-th priority, that is, the first priority in the goal domain (step S43).

A concrete example will be described with reference to Table 7 and FIG. 8. Since the goal domain is a domain A-19, and the order of cases in the domain A-19 is gc****ea, a virtual case assigned the first priority in this domain A-19 is g.

On the other hand, the domains to which the state of the electrophotographic copying machine can be transferred which are described in the work script A-1 and the orders of cases in the domains are respectively as follows:

A-2:ab****fg
A-3:ae****cg
A-4:ba****gh

Furthermore, the domain to which the present state of the electrophotographic copying machine belongs and the order of cases in the domain is as follows:

A-1:ab****hg

It is also considered that the state of the copying machine is not transferred from the domain A-1 to which the present state of the copying machine belongs. Consequently, the domains to which the state of the copying machine can be transferred are A-2, A-3 and A-4 and A-1 to which the present state of the copying machine belongs.

If the priority of the above described virtual case g in each of the four domains to which the state of the electrophotographic copying machine can be transferred is detected, the priority is as follows:
A-2:eighth priority
A-3:eighth priority
A-4:seventh priority
A-1:eighth priority At this time, a domain to which the state of the copying machine can be transferred where the priority of the virtual case assigned the first priority in the goal domain is the highest is a domain which is the nearest to the goal domain. In this case, therefore, the domain A-4 is a domain which is the nearest to the goal domain. Accordingly, it is determined that the domain A-4 is a domain to which the state of the copying machine is to be transferred.

It is then judged in the step S44 whether or not the order of the distances from all the domains to which the state of the electrophotographic copying machine can be transferred to the goal domain can be determined. In the above described concrete example, it is judged that the domain A-4 is the nearest to the goal domain. Since the order of the distances from the domains A-1, A-2 and A-3 to the goal domain is not determined, however, the distances from the domains to which the state of the copying machine can be transferred to the goal domain are then temporarily determined on the basis of a virtual case assigned the second priority in the goal domain, that is, the virtual case c in the concrete example (step S43).

In the above described manner, the distances from all the domains to which the state of the electrophotographic copying machine can be transferred to the goal domain are determined.

The determination of the distances from the domains to which the state of the electrophotographic copying machine can be transferred to the goal domain may be terminated in the stage in which there are a plurality of domains to which the state of the copying machine can be transferred and it is judged that any one of the domains to which the state of the copying machine can be transferred is the nearest to the goal domain, that is, at the time point where it is judged that the domain A-4 is the nearest to the goal domain on the basis of the virtual case g assigned the first priority in the goal domain in the above described concrete example.

Thereafter, a domain to which the state of the electrophotographic copying machine can be transferred which is the nearest to the goal domain is taken as a domain Z (the domain Z is the domain A-4 in the above described concrete example) in the step S46, and operations of the actuators for transferring the state of the copying machine from the domain to which the present state of the copying machine belongs to the domain Z are derived from the work script A-1 (step S47). The operations of the actuators are executed (step S48).

In the operations of the actuators in the step S48, when the amount of the operation of each of the actuators is not described in the work script, the actuator is operated by a predetermined unit amount. If not only the type of actuator to be operated as the contents of the operations but also the amount of the operation of the actuator is described in the work script as described above, the actuator is operated by the amount of the operation described. The amount of the operation is preferably the amount of one operation in which the state of the electrophotographic copying machine can be transferred.

Description was made by taking as an example a case where the resolution, that is, the number of domains obtained by division shown in Table 7 is 24. As a more general example, description is now made by taking as an example a case where the resolution is 96.

In order to make the description understandable, the following are premises:
goal domain:
A-40 (gfhcebda)
domain to which the present state of the electrophotographic copying machine belongs:
A-2 (abedfchg)
domains to which the state of the electrophotographic copying machine can be transferred from A-2:
A-1 (abdecfhg)
A-5 (aedbfhcg)
A-7 (bacfdegh)
A-8 (bafcedgh)
A-2 (self)

A virtual case assigned the first priority in the goal domain A-40 is then examined. In this case, it is the virtual case g.

The priority of the virtual case g in each of the above described domains to which the state of the electrophotographic copying machine can be transferred is examined. The results are as follows:
A-1:eighth priority
A-5:eighth priority
A-7:seventh priority
A-8:seventh priority
A-2(self):eighth priority At this time, a domain to which the state of the copying machine can be transferred is a domain which comes closer to the goal domain if the priority of the virtual case g in the domain to which the state of the copying machine can be transferred is higher than that in the domain A-2 (self), while being a domain which moves farther apart from the goal domain if it is lower than that in the domain A-2 (self). In the above described case, therefore, it is found that A-1 and A-5 are unclear, while A-7 and A-8 are domains which come closer to the goal domain than the domain to which the present state of the copying machine belongs.

Therefore, the distances from the domains to which the state of the electrophotographic copying machine can be transferred to the goal domain at this time point are temporarily determined as follows:
A-7, A-8 < A-1, A-5, A-2 (self)

A virtual case assigned the second priority in the goal domain A-40 is then examined. In this case, it is the virtual case f.

The priority of the virtual case f in each of the domains to which the state of the electrophotographic copying machine can be transferred is examined. The results are as follows:
A-1:sixth priority
A-5:fifth priority
A-7:fourth priority
A-8:third priority
A-2 (self):fifth priority If the priority at this time point is considered in the above described temporary determination of the distances to the goal domain, it is found that it is the domain A-8 that comes closest to the goal domain and it is the domain A-7 that comes next closest to the goal domain out of the domains to which the state of the copying machine can be transferred, and the domain A-1 is a domain which moves farthest apart from the goal domain. Consequently, the distances from the domains to which the state of the electrophotographic copying machine can be transferred to the goal domain are temporarily determined in more detail as follows:

A-8 < A-7 < A-5, A-2 (self) < A-1

A virtual case assigned the third priority in the goal domain A-40 is then examined. In this case, it is the virtual case h.

The priority of the virtual case h in each of the domains to which the state of the electrophotographic copying machine can be transferred is examined. The results are as follows:

A-1:seventh priority
A-5:sixth priority
A-7:eighth priority
A-8:eighth priority
A-2 (self):seventh priority At this time point, the priorities of the distances from A-5 and A-2 to the goal domain are not clear. Therefore, it is found that A-5 is a domain which comes closer to the goal domain than A-2 from the priorities of the virtual case h. Consequently, the distances from the domains to which the state of the electrophotographic copying machine can be transferred to the goal domain are finally determined as follows:

A-8 < A-7 < A-5 < A-2 (self) < A-1

The foregoing general processing is performed in a routine in accordance with the flow of the steps S42, S43, S44, S45, S43 and S44 shown in FIG. 14.

Furthermore, an image diagram of this processing is shown in FIG. 15. As can be seen from FIG. 15, domains to which the state of the electrophotographic copying machine can be transferred around a domain to which the present state of the copying machine belongs are derived, and the distances from the domains to which the state of the copying machine can be transferred to the goal domain are assigned priorities.

Turning to FIG. 9, description of the entire control processing will be continued.

Repair operations are performed by the above described operations of the actuators in the step S16 and then, fault diagnosis is made (step S17). The contents of the fault diagnosis are the same as the contents described in the step S14. That is, the fault diagnosis is made in accordance with the subroutine shown in FIG. 10.

Thereafter, fault judgment is made (step S18). The fault judgment is made by comparing the output of the copy density sensor Os with the reference values shown in FIG. 3 as in the step S12.

When no fault symptom appears, that is, the output value of the copy density sensor Os is within the range of a normal image between the reference values for fault judgment (see FIG. 3) as a result of the fault judgment, the processing is terminated considering that the repair processing has succeeded.

On the other hand, if it is judged that a fault symptom still appears as a result of the fault judgment, it is judged whether or not a domain determined by the fault diagnosis made in the step S17 is transferred to another domain from the domain determined in the step S14 (step S19). If the domain to which the state of the electrophotographic copying machine belongs is not transferred to another domain, for example, the domain to which the state of the copying machine belongs is not transferred to another domain from the domain A-1 in the above described concrete example, the operating range of an actuator related to the repair operations is then judged (step S20). If the operating range of the actuator is within the operation limit, the program is returned to the step S16 again. In the step S16, the repair operations are performed.

Above discribed processing is illustrated in FIG. 8. In FIG. 8, one arrow indicates the amount of transition in one repair operation. It is found that the actuator related to the repair operations is operated a plurality of times in the operation range, and the domain to which the state of the electrophotographic copying machine belongs may be transferred to another domain by a plurality of operations.

When the operating range of the actuator is outside of the operation limit in the step S20, the actuator cannot be further operated. In the case, therefore, it is judged whether or not the trade-off of the goal domain is allowed (step S22). The trade-off of the goal domain is that the goal domain set in the step S13, for example, the domain A-19 in the above described concrete example is changed into the other domain, for example, the domain A-18. If the trade-off of the goal domain is not allowed, the processing is terminated considering that the repair operations have failed.

It is judged in the step S19 whether or not the domain to which the state of the electrophotographic copying machine belongs is transferred to another domain. If the domain is transferred, it is judged whether or not the transition conflicts with the transition rule (step S21). The judgment whether or not the transition conflicts with the transition rule is made depending on whether or not the state of the copying machine is transferred to a domain to which the state of the copying machine can be transferred which is described in the work script. Specifically, when as a result of repair operations described in a certain work script, the state of the copying machine is transferred to not a domain to which the state of the copying machine can be transferred which is described in the work script but a different domain, it is judged that the transition conflicts with the transition rule. If the transition does not conflict with the transition rule, the program is returned to the step S14 again. In the step S14, the fault diagnosis is made, to repeat the processing.

If it is judged in the step S21 that the state of the electrophotographic copying machine is transferred to a domain which conflicts with the transition rule, it is considered that the resolution of the diagnosis is changed due to, for example, the decrease in the sensitivity of sensors. Accordingly, it is dangerous to continue the repair work in such a state. Consequently, the repair work may be forcedly interrupted and terminated in the case. Alternately, it is judged whether or not the trade-off of the goal domain is allowed as shown in the flow chart (step S22). If the trade-off of the goal domain is allowed, the goal domain may be set again (step S23), to repeat the processing of the fault diagnosis in the step S14 and the subsequent processing.

Figure 16:
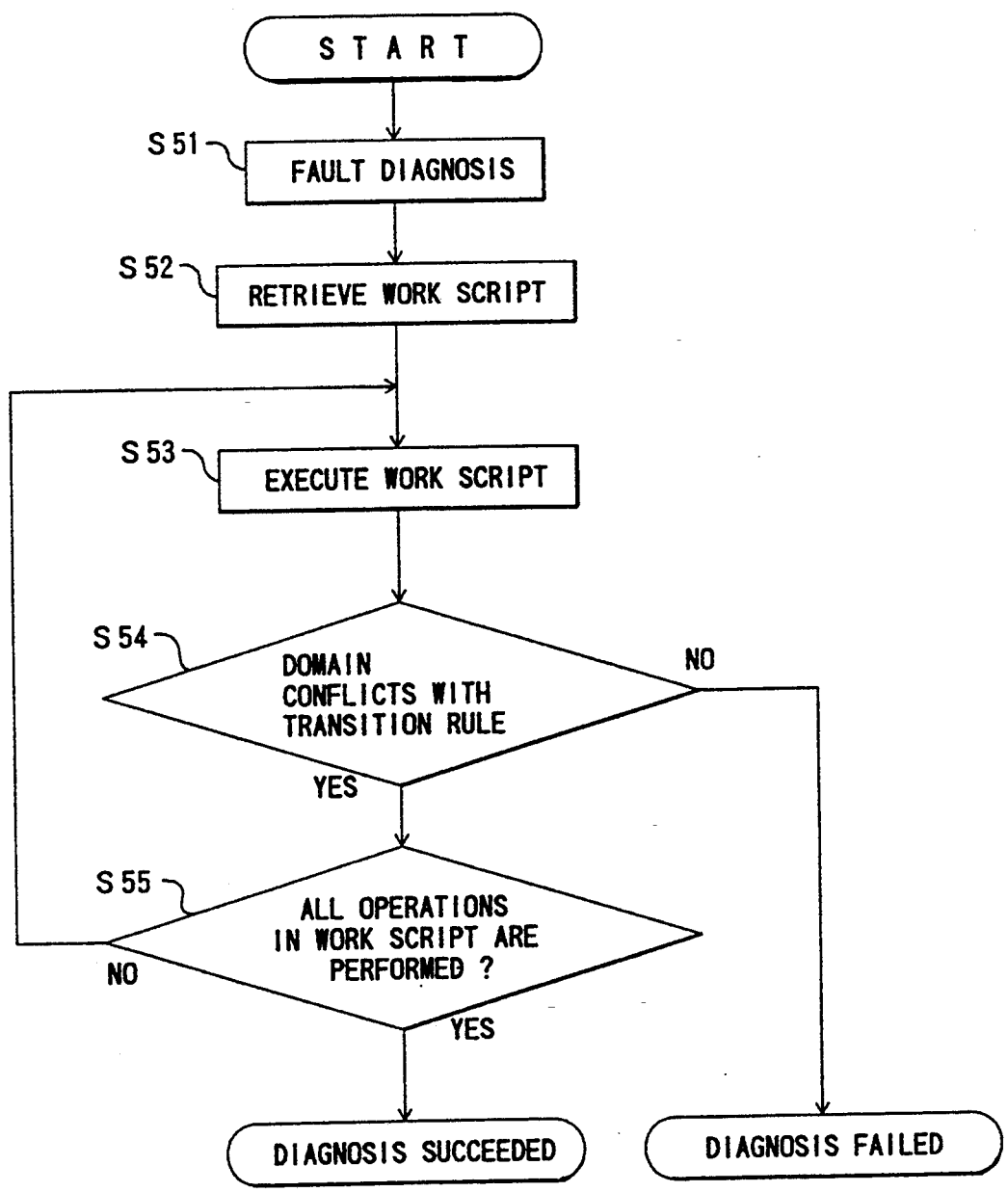
FIG. 16 is a flow chart showing the contents of processing for improving the diagnosis precision.

Furthermore, in the above described fault diagnosis in the step S14 or S17 shown in FIG. 9, processing as shown in FIG. 16 may be performed to improve the diagnosis precision.

Description is made with reference to the flow chart of FIG. 16. Fault diagnosis is first made (step S51), a work script is retrieved (step S52), and repair operations described in the work script are performed (step S53).

It is judged whether or not the state of the electrophotographic copying machine is not transferred to a domain which conflicts with the transition rule as a result of performing the repair operations described in the work script (step S54). It is judged whether or not all the repair operations described in the work script are performed (step S55). If it is judged that all the repair operations are not performed, the remaining repair operations in the work script are performed (step S53).

When all the repair operations described in the work script are thus performed so that the state of the electrophotographic copying machine is transferred to a domain described in the work script, it is judged that the fault diagnosis has succeeded. If the state of the copying machine is transferred to a domain which conflicts with the transition rule, it is judged that the fault diagnosis has failed.

For example, if the domain to which the present state of the electrophotographic copying machine belongs is A-1 as a result of the fault diagnosis, the state of the copying machine should be transferred to the domains A-4, A-2 and A-3 by the respective operations. If the state of the copying machine is transferred to all the domains, it can be confirmed that the result of the diagnosis which is judged on the basis of the outputs of the sensors, that is, the judgment that the domain to which the present state of the copying machine belongs is A-1 is correct.

If it is judged that the diagnosis has failed in the processing shown in FIG. 16, the outputs of the sensors are not correct, so that it can be judged that the diagnosis is erroneously made due to, for example, the decrease in the sensitivity of the sensors.

Although in the foregoing description, the processing shown in FIG. 16 can be performed in the fault diagnosis in the step S14 or S17 in the flow chart of FIG. 9, the processing shown in FIG. 16 may be processing for making fault diagnosis at arbitrary timing to conform that the outputs of the sensors are correct independently of the processing in the flow chart of FIG. 9.

The above described electrophotographic copying machine having a self diagnosis and self repair function according to the present embodiment can be described using C++ Programming Language on MS-DOS as a system composed of a microcomputer and the like constituting the software portion incorporated in the electrophotographic copying machine and is concretely constituted by a system having a capacity of approximately 280 KB. In addition, when processing of fault diagnosis and fault repair, that is, processing in the flow chart of FIG. 9 is actually performed using this system, it is confirmed by experiments that the repair is completed within several minutes, although time required for the repair varies depending on the state of an object at the time of developing a fault.

Meanwhile, the amount of the operation of each of the actuators in the work script may be a fixed value or may be made variable depending on the result of the operation. If the amount of the operation of the actuator is made variable, it is possible to improve the efficiency of repair processing.

Description is now made of another embodiment of the present invention.

In the above described embodiment, the virtual cases are stored for each fault symptom in the virtual case storage portion 12 (see FIG. 2), the domains obtained by division are determined for each fault symptom, and the work script which is knowledge representing the relationship between the contents of the operations of the actuators at the time of repair and the transfer of the state of the electrophotographic copying machine is set to correspond to each of the domains in the work script table 15 (see FIG. 2).

However, the work script table 15 may not be provided. In each of the domains obtained by division, not only the order of cases in the domain but also a repair method in the domain may be described, as shown in Table 8.

TABLE 8

Division of fog space into domains

| domain No. | order of cases | repair method H1 | Vn | Vb |
| --- | --- | --- | --- | --- |
| A - 1 | abdcefhg | +0.9 | 0.0 | +0.1 |
| A - 2 | abdecfhg | +0.8 | 0.0 | +0.2 |
| A - 3 | abedfchg | +0.8 | +0.1 | +0.1 |
| : | : | : | : | : |
| A - 48 | dhcgaebf | +0.6 | −0.3 | +0.1 |
| A - 49 | eafbhdgc | +0.1 | −0.8 | −0.1 |
| : | : | : | : | : |
| A - 95 | hgedfcab | 0.0 | −0.6 | −0.4 |
| A - 96 | hgefdcab | +0.1 | −0.5 | −0.4 |

In Table 8, H1, Vn or Vb in the repair method described represents the amount of an operation for each parameter of an actuator to be operated, a "+" mark given to the amount of the operation means that the actuator is increased, and a "−" mark means that the actuator is decreased.

If the Table 8 is previously stored, processing in the following expansion plan 1 or expansion plan 2 can be performed.

Specifically, a repair method is previously described in each of the domains, as shown in Table 8, as the expansion plan 1. If a domain to which the electrophotographic copying machine belongs is judged at the time of developing a fault, therefore, a repair method described in the domain can be carried out until a fault symptom is corrected at a ratio described in the repair method. Specifically, it is possible to make repair from a domain to which the copying machine belongs when it develops a fault to the goal domain at a breath without dealing with the repair process indicating how the state of the copying machine is transferred.

Furthermore, repair processing can be performed in the following manner as the expansion plan 2. First, a repair method described in the domain to which the state of the electrophotographic copying machine belongs when it develops a fault is carried out, to make repair until the state of the copying machine is transferred. If the state of the copying machine is transferred, a repair method described in a domain to which the state of the copying machine is transferred is carried out, to further transfer the state of the copying machine. In the above descried manner, the state of the copying machine can be transferred to the goal domain while dealing with the repair process.

FIG. 17 is a diagram showing images of the above described expansion plan 1 and expansion plan 2.

Although the above described expansion plan 1 and expansion plan 2 are embodiments for performing repair processing simpler than the embodiment first described, the following embodiment can be prepared as an embodiment for performing repair processing more simple.

When virtual cases are created on the basis of the parameter model shown in FIG. 4, the following limitation is placed. Specifically, when the parameter of the copy density Os is abnormal, for example, it is assumed that (1) the cause is always the change of a single parameter, and (2) the change of the parameter always affects the sensing object parameters (parameters encircled in FIG. 4). If virtual cases are created under the conditions (1) and (2), therefore, the number of virtual cases in a fault symptom "image fog" is not eight but four. Examples are virtual cases a, e, f and g shown in Table 9.

TABLE 9

| name of virtual case | image fog grade of parameter | | | repair method | |
|---|---|---|---|---|---|
| | Ds | Vs | X | | |
| a | +1.0 | +1.0 | −1.0 | H1 | up |
| e | +1.0 | +1.0 | N 1.0 | Vn | down |
| f | +1.0 | N 1.0 | N 1.0 | Vb | down |
| g | N 1.0 | N 1.0 | N 1.0 | Vt | down |

Therefore, repair methods are previously described, respectively, with respect to the four virtual cases. A repair method described in a virtual case having the highest degree of coincidence is carried out in accordance with the result of fault diagnosis. Every time the repair is made, the fault diagnosis is made, to detect a virtual case having the highest degree of coincidence and carry out a repair method described in the virtual case.

According to the embodiment, there can be provided an electrophotographic copying machine capable of performing processing even if the capacity of a virtual case storage portion is small.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus having a repair function, comprising:

sensor means provided in predetermined areas of the apparatus for detecting a predetermined physical amount or change in the physical amount;

actuator means provided in predetermined areas of the apparatus for performing predetermined operations;

conversion means for converting detected values of said sensor means into fuzzy qualitative values using fuzzy membership functions;

case storage mans for storing a plurality of virtual cases each of which is a representation of a state, which the apparatus can take up when a fault symptom appears in the apparatus, by a qualitative value;

diagnosis means for comparing the fuzzy qualitative values obtained by conversion by said conversion means with the plurality of virtual cases stored in said case storage means to diagnose a present state of the apparatus;

operation information storage means for storing operation information for repair to correspond to each of domains, into which a qualitative quantity space which the apparatus can take up, is divided; and repair execution means for judging which of the plurality of domains obtained by division is a domain to which the present state of the apparatus which is diagnosed by said diagnosis means belongs, for reading out the operation information corresponding to the domain to which the present state of the apparatus belongs from said operation information storage means, and for operating said actuator means to execute repair.

2. The image forming apparatus having a self-repair function according to claim 1, further comprising forced operation means provided for said conversion means for operating, when the detected values of the sensor means are in a predetermined neutral space where the grades in the fuzzy membership functions take intermediate values, said actuator means so that the detected values of the sensor means go out of said neutral space.

3. The image forming apparatus having a self-repair function according to claim 1, wherein the operation information stored in said operation information storage means comprises representations of the operations of said actuator means and a domain to which the state of the apparatus can be transferred by the operations.

4. The image forming apparatus having a self-repair function according to claim 3, wherein said repair execution means comprises domain determination means for determining a domain to which the state of the apparatus is to be transferred, and operation means for operating the actuator means so that the state of the apparatus is transferred to the domain determined by the domain determination means.

5. The image forming apparatus having a self-repair function according to claim 4, further comprising confirmation means provided for said repair execution means for confirming, when the state of the apparatus is transferred from a domain to which the present state of the apparatus belongs to the other domain by executing the repair, whether or not the domain to which the state of the apparatus is transferred is a consistent domain.

6. The image forming apparatus having a self-repair function according to claim 1, wherein the amount of one operation of each of the actuator means by said repair execution means is so restricted that the domain to which the state of the apparatus is transferred is a domain adjacent to the domain to which the present state of the apparatus belongs.

7. The image forming apparatus having a self-repair function according to claim 1, further comprising evaluation means provided for said diagnosis means for judging which of said plurality of domains obtained by the division is a domain to which the diagnosed present state of the apparatus belongs, to evaluate the correctness or incorrectness of the judgment, said repair execution means executing the repair when said evaluation means evaluates the correctness of the judgment.

8. The image forming apparatus having a self-repair function according to claim 1, further comprising goal domain setting means for setting the goal of repair to any one of said plurality of domains obtained by division, said repair execution means executing the repair so that the state of the apparatus is transferred to the domain set by said goal domain setting means.

9. The image forming apparatus having a self-repair function according to claim 8, further comprising resetting means for resetting the goal domain set by said goal domain setting means when the actuator means related to said repair reaches the operation limit.

10. The image forming apparatus having a self-repair function according to claim 5, further comprising
goal domain setting means for setting the goal of repair to any one of said plurality of domains obtained by the division,
said repair execution means executing the repair so that the state of the apparatus is transferred to the domain set by said goal domain setting means.

11. The image forming apparatus having a self-repair function according to claim 10, further comprising
resetting means for resetting the goal domain set by said goal domain setting means when said confirmation means confirms that the domain to which the state of the apparatus is transferred is an inconsistent domain.

12. The image forming apparatus having a self-repair function according to claim 1, further comprising
number setting means provided for said operation information storage means for setting, when the qualitative quantity space is divided into the plurality of domains, the number of the domains obtained by division.

13. The image forming apparatus having a self-repair function according to claim 1, further comprising
repair operation continuation means for causing said diagnosis means to diagnose the state of the apparatus after execution of the repair by said repair execution means, and judging which of said plurality of domains obtained by division is a domain to which the diagnosed state of the apparatus after execution of the repair belongs, to continue the same repair operations as those performed by said repair execution means when the domain to which the state of the apparatus after execution of the repair belongs is not changed from the domain to which the state of the apparatus before execution of the repair belongs.

14. An image forming apparatus having a self-diagnosis function, comprising:
sensor means provided in predetermined areas of the apparatus for detecting a predetermined physical amount or change in the physical amount;
actuator means provided in predetermined areas of the apparatus for performing predetermined operations;
conversion means for converting detected values of said sensor means into fuzzy qualitative values using fuzzy membership functions;
case storage means for storing a plurality of virtual cases each of which is a representation of a state, which the apparatus can take up when a fault symptom appears in the apparatus, by a qualitative value;
diagnosis means for comparing the fuzzy qualitative values obtained by conversion by said conversion means with the plurality of virtual cases stored in said case storage means to diagnose a present state of the apparatus;
operation information storage means for storing representations of the operations of said actuator means and a domain to which the present state of the apparatus can be transferred by the operations as operation information for repair to correspond to each of a plurality of domains, into which a qualitative quantity space which the apparatus can take up, is divided;
judgement means for judging which of said plurality of domains obtained by division is a domain to which the present state of the apparatus which is diagnosed by said diagnosis means belongs, for reading out said operation information corresponding to the domain to which the present state of the apparatus belongs from said operation information storage means, and for performing all the operations of the actuator means included in the operation information, thereby to judge whether or not the state of the apparatus is consistently transferred to the domain to which the state of the apparatus can be transferred and which is stored as the operation information.

* * * * *